US011386760B2

(12) United States Patent
Vazirani

(10) Patent No.: US 11,386,760 B2
(45) Date of Patent: *Jul. 12, 2022

(54) NEXT GENERATION MONITORING SYSTEM

(71) Applicant: Comcast Cable Communications, LLC, Philadelphia, PA (US)

(72) Inventor: Deven Vazirani, Wayne, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/804,603

(22) Filed: Feb. 28, 2020

(65) Prior Publication Data

US 2021/0020007 A1 Jan. 21, 2021

Related U.S. Application Data

(63) Continuation of application No. 15/664,364, filed on Jul. 31, 2017, now Pat. No. 10,621,839.

(51) Int. Cl.
| | |
|---|---|
| G08B 13/24 | (2006.01) |
| G08B 15/00 | (2006.01) |
| H04W 4/024 | (2018.01) |
| H04W 4/02 | (2018.01) |
| H04W 4/90 | (2018.01) |
| G08B 13/196 | (2006.01) |
| G08B 29/18 | (2006.01) |
| G08B 7/06 | (2006.01) |
| G08B 25/00 | (2006.01) |
| G08B 13/16 | (2006.01) |

(52) U.S. Cl.
CPC ....... G08B 13/19695 (2013.01); G08B 7/066 (2013.01); G08B 13/24 (2013.01); G08B 15/00 (2013.01); G08B 25/001 (2013.01); G08B 29/188 (2013.01); H04W 4/024 (2018.02); G08B 13/1672 (2013.01); H04W 4/02 (2013.01); H04W 4/90 (2018.02)

(58) Field of Classification Search
CPC ............................................ G08B 13/19695
See application file for complete search history.

(56) References Cited

U.S. PATENT DOCUMENTS

| 5,220,680 A | 6/1993 | Lee |
| 9,215,585 B2 | 12/2015 | Pridmore et al. |

(Continued)

*Primary Examiner* — Joseph H Feild
*Assistant Examiner* — Pameshanand Mahase
(74) *Attorney, Agent, or Firm* — Banner & Witcoff, Ltd.

(57) ABSTRACT

Methods and systems are described for the detection and identification of a cellular device that crosses a perimeter associated with a premises that is installed with a monitoring system. Subsequently, a determination of an intruder crossing the perimeter and/or entering a building within the premises may be made based on receiving unique identification values for the cellular device and/or information associated with a user of the cellular device. One or more sensors present within or near the premises may be configured to send alert information when tripped. The monitoring system may be configured to determine a location of the cellular device, an identity of the user of the cellular device, additional information stored, transmitted or received by the cellular device, and safe escape routes that may be sent to one or more user devices registered with the monitoring system.

40 Claims, 11 Drawing Sheets

(56) References Cited

U.S. PATENT DOCUMENTS

| | | | |
|---|---|---|---|
| 10,621,839 B2* | 4/2020 | Vazirani | G08B 25/001 |
| 2009/0119754 A1* | 5/2009 | Schubert | H04L 63/205 |
| | | | 726/4 |
| 2010/0100945 A1* | 4/2010 | Ozzie | H04L 9/321 |
| | | | 726/5 |
| 2012/0280783 A1* | 11/2012 | Gerhardt | H04L 63/08 |
| | | | 340/5.6 |
| 2015/0061859 A1* | 3/2015 | Matsuoka | G08B 25/008 |
| | | | 340/501 |
| 2017/0180921 A1 | 6/2017 | Pelochino et al. | |
| 2018/0137730 A1* | 5/2018 | White | H04W 4/80 |

\* cited by examiner

NEXT GENERATION MONITORING SYSTEM

CROSS-REFERENCE TO RELATED APPLICATIONS

This application is a continuation of and claims priority to U.S. patent application Ser. No. 15/664,364, filed on Jul. 31, 2017, the content of which is incorporated herein by reference in its entirety.

BACKGROUND

A monitoring system associated with a building typically detects an intruder and triggers an alarm after a sensor or alarm associated with the building has been tripped. A company affiliated with the monitoring system will then attempt to notify a registered user of the alarm and attempt to verify the alarm via a user response. Often times the alarms that are triggered after an intruder has already broken into the building provide a very short time duration for registered users present in the building to safely respond and/or evacuate the building and in addition, valuable time is wasted during a genuine alarm event in an attempt to verify that the alarm event is a legitimate alarm event. There remains an ever-present need to improve the effectiveness of security systems in discerning false alarms from true ones, and in quickly handling the true ones.

SUMMARY

In light of the foregoing background, the following presents a simplified summary of various features described herein in order to provide a basic understanding of some aspects described herein. This summary is not an extensive overview, and is not intended to identify key or critical elements or to delineate the scope of the claims. The following summary merely presents various described aspects in a simplified form as a prelude to the more detailed description provided below.

Some examples herein may take advantage of certain criminal intruders who happen to carry their wireless devices (e.g., cellular phones, laptops, etc.) with them when breaking into a premises. Wireless devices (e.g., picocells, microcells, LTE antennas, cellular interceptors, wireless routers, etc.) at the premises may automatically seek to communicate with wireless devices in general, and may seek to connect with the intruder's cellular phone. If such a connection is made, then the wireless devices at the premises may determine that the intruder's cellular phone is a suspect one (e.g., because the intruder's cellular phone is not previously-known to the wireless device), and may take action, such as sending messages to the intruder's cellular phone to deter the intruder from breaking into the premises, obtaining information that can be used to identify the intruder, and in some cases, taking control over some of the functionality of the intruder's cellular phone. A monitoring system may encompass the wireless devices at the premises for monitoring the premises and/or an area associated with the premises. The monitoring system may be communicatively coupled to devices (e.g., via an interconnected network of physical devices, sensors, actuators, computing devices in an Internet of Things (IoT) system) within and/or otherwise associated with the premises, may establish communication channels with wireless devices entering and/or exiting the premises, and may monitor one or more sensors, detectors or cameras within and/or otherwise associated with the premises to detect a threat situation associated with a presence of the intruder, prevent the intruder from breaking into the premises, provide safe exit routes to registered users present within and/or near the premises, sound audible alarms within the premises, and/or notify security personnel during the threat situation.

Some aspects described herein may provide for determining authorization levels associated with suspect wireless devices that have entered the premises and/or crossed a secure perimeter associated with the premises, track the intruder's location in real-time, and/or determining one or more accomplices of the intruder during the threat situation by tracking voice and/or data signals sent and/or received by the intruder's cellular phone.

The summary here is not an exhaustive listing of the novel features described herein, and are not limiting of the claims. These and other features are described in greater detail below.

BRIEF DESCRIPTION OF THE DRAWINGS

Some features herein are illustrated by way of example, and not by way of limitation, in the accompanying drawings. In the drawings, like numerals reference similar elements between the drawings.

DETAILED DESCRIPTION

In the following description of various illustrative examples, reference is made to the accompanying drawings, which form a part hereof, and in which is shown, by way of illustration, various examples that may be practiced. It is to be understood that other examples may be utilized and structural and functional modifications may be made, without departing from the scope of the features described herein. Various aspects are capable of other examples and of being practiced or being carried out in various different ways. In addition, the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof.

Various aspects described herein may be embodied as a method, a computer system, or a computer program product. Accordingly, those aspects may take the form of an entirely hardware embodiment, an entirely software embodiment or an embodiment combining software and hardware aspects. Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, removable storage media, solid state memory, RAM, magnetic storage devices, and/or any combination thereof. In addition, the functionality may be embodied in whole or in part in firmware or hardware equivalents, such as integrated circuits, field programmable gate arrays (FPGAs), and the like. Various signals representing data or events as described herein may be transferred between a source and a destination in the form of electromagnetic waves traveling through signal-conducting media such as metal wires, optical fibers, and/or wireless transmission media (e.g., air and/or space).

Figure 1:
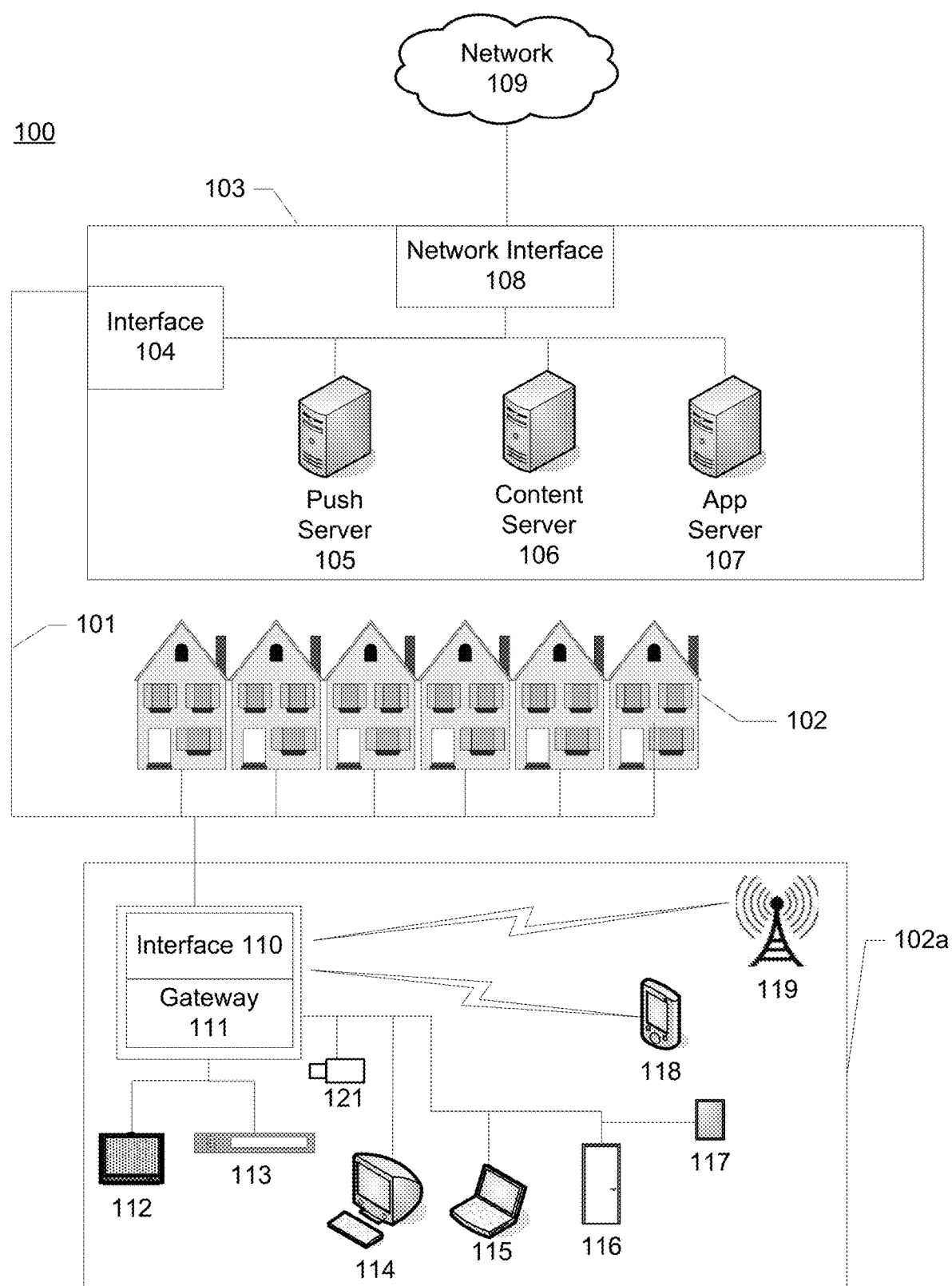
FIG. 1 shows an example communication network that may be used to implement one or more aspects as described herein.

FIG. 1 shows an example information distribution network 100 on which many of the various features described herein may be implemented. Network 100 may be any type of information distribution network, such as satellite, telephone, cellular, wireless, etc. One example may be a wireless network, an optical fiber network, a coaxial cable network, or a hybrid fiber/coax (HFC) distribution network. Such networks 100 use a series of interconnected communication links 101 (e.g., coaxial cables, optical fibers, wireless, etc.) to connect multiple premises 102 (e.g., businesses, homes, consumer dwellings, etc., and/or other types of devices such as cellular interceptor towers, tablets, cell phones, laptops, and/or computers, etc.) to a local office 103 (e.g., a headend, a processing facility, a local exchange carrier, a gateway, a network center or other network facility, etc.). The local office 103 may transmit downstream information signals onto the links 101, and each premises 102 may have one or more receivers used to receive and process those signals. According to some aspects, the network 100 may be associated with a home security system.

There may be one or more links 101 originating from the local office 103, and they may be split a number of times to distribute the signal to various premises 102 in the vicinity (which may be many miles) of the local office 103. The links 101 may include components not illustrated, such as splitters, filters, antennas, amplifiers, etc. to help convey the signal clearly, but in general each split introduces a bit of signal degradation. Portions of the links 101 may also be implemented with fiber-optic cable, while other portions may be implemented with coaxial cable, other lines, or wireless communication paths.

The local office 103 may include a termination system (TS) 104, such as a cable modem termination system (CMTS) in an example of an HFC-type network, which may be a computing device configured to manage communications between devices on the network of links 101 and backend devices such as servers 105-107 (to be discussed further below). The TS 104 may comprise an Optical Network Terminator (ONT) system, in another example of an HFC-type network, that interfaces with Passive Optical Networks (PONs), Ethernet-PONs (EPONs) and Gigabit-capable PONs (GPONs). In the example of an HFC-type network, the TS may be as specified in a standard, such as the Data Over Cable Service Interface Specification (DOCSIS) standard, published by Cable Television Laboratories, Inc. (a.k.a. CableLabs), or the TS 104 may be a similar or modified device instead. The TS 104 may be configured to place data on one or more downstream frequencies to be received by modems at the various premises 102, and to receive upstream communications from those modems on one or more upstream frequencies. The local office 103 may also include one or more network interfaces 108, which can permit the local office 103 to communicate with various other external networks 109. These networks 109 may include, for example, Internet Protocol (IP) networks Internet devices, public switched telephone networks (PSTN), cellular telephone networks, fiber optic networks, local wireless networks (e.g., WiMAX), satellite networks, and any other desired network, and the interface 108 may include the corresponding circuitry needed to communicate on the network 109, and to other devices on the network such as the PSTN and corresponding cellular devices connected to the PSTN.

As noted above, the local office 103 may include a variety of servers 105-107 that may be configured to perform various functions. For example, the local office 103 may include one or more push notification servers 105. The one or more push notification servers 105 may be one or more computing devices and may generate push notifications to deliver data and/or commands to the various premises 102 in the network (or more specifically, to the devices in the premises 102 that are configured to detect such notifications, including for example, monitoring system 305 and/or various wired and/or wireless devices).

The local office 103 may also include one or more content servers 106. The one or more content servers 106 may be one or more computing devices that are configured to provide content to users in the premises. This content may be, for example, video on demand movies, television programs, songs, services, information, text listings, security services, etc. In some instances, the content may include cached databases of criminal records, warrants, on-going legal proceedings, etc. The content server 106 may include software to validate (or initiate the validation of) user identities and entitlements (e.g., for example, to execution of various functions in the security system, locate and retrieve (or initiate the locating and retrieval of) requested content including security footage, encrypt the content, and initiate delivery (e.g., streaming, transmitting via a series of content fragments) of the content to the requesting user and/or device.

The local office 103 may also include one or more application servers 107. The one or more application servers 107 may be may be one or more computing devices that may be configured to offer and/or provide any desired service (e.g., monitoring services, security services, and applications), and may run various languages and operating systems (e.g., servlets and JSP pages running on Tomcat/MySQL, OSX, BSD, Ubuntu, Red Hat Linux, HTML5, JavaScript, AJAX and COMET). For example, an application server 107 may be responsible for monitoring and controlling networked devices within premises 102. Another application server 107 may be responsible for storing and retrieving user profiles, social networking contacts (such as FACEBOOK™ contacts), emergency contact information, collecting television program listings information and generating a data download for electronic program guide listings. Another application server 107 may be responsible for monitoring user viewing habits and collecting that information for use in configuring monitoring system settings. Another application server 107 may be responsible for formatting and inserting alert messages, alarm events, warnings, etc. in a video stream and/or content item being transmitted to the premises 102. Another application server 107 may perform various monitoring system functions including storing remotely security camera footage, storing registered cellular device and other wireless device identification values, storing past event history, storing monitoring system criteria, and storing credentials to enable remote operation, control, alarm zone notifications, alarm shutoff, sensor(s) activation/de-activation and other security system related functions.

An example premises 102a may include an interface 110 (such as a modem, or another receiver and/or transmitter device suitable for a particular network (e.g., a wireless or wired network), which may include transmitters and receivers used to communicate on the links 101 and with the local office 103. The interface 110 may be, for example, a coaxial cable modem (for coaxial cable lines 101), a fiber interface node (for fiber optic lines 101), a cellular wireless antenna, a wireless transceiver (e.g., ZigBee, Z-wave, Thread, Bluetooth, Wi-Fi, etc.), and/or any other desired modem device. The interface 110 may be connected to, or be a part of, a gateway interface device 111. The gateway interface device 111 may be a computing device that communicates with the interface 110 to allow one or more other devices in the home and/or remote from the home to communicate with the local office 103 and other devices beyond the local office. The gateway 111 may be a set-top box (STB), a cellular interceptor tower, digital video recorder (DVR), computer server, monitoring system, or any other desired computing system. The gateway 111 may also include (not shown) local network interfaces to provide communication signals to other devices in the home (e.g., user devices), such as display devices 112 (e.g., televisions), additional STBs or DVRS 113, personal computers 114, laptop computers 115, premises security system 116, window sensors 117, wireless devices 118 (wireless laptops, tablets and netbooks, cellular phones, televisions, personal digital assistants (PDA), etc.), communication devices 119 (e.g., a cellular or a wireless site, a cellular interceptor tower, a picocell, a microcell, a femtocell, an LTE antenna, etc.), image capture devices 121 (e.g., a video camera, a camera, etc.), and/or any other desired computers, audio recorders and transmitters, sensors, such as ambient light sensors, passive infrared sensors, humidity sensors, temperature sensors, carbon dioxide sensors, carbon monoxide sensors, and others. Examples of the local network interfaces may include Multimedia Over Coax Alliance (MoCA) interfaces, Ethernet interfaces, universal serial bus (USB) interfaces, wireless interfaces (e.g., IEEE 802.11), cellular LTE interfaces, Bluetooth interfaces, ZigBee interfaces and others.

The communication devices 119 (such as cellular interceptor, microcell, picocell, femtocell, LTE antenna, etc.) may emulate legitimate cellular base stations to establish a cell site at the premises 102a. The communication devices 119 may comprise one or more cellular interceptors, microcells, picocells, LTE antennas, etc. Any cellular device that enters a range of coverage of the communication devices 119 will automatically connect to the communication devices 119 via a cellular wireless protocol (such as GSM or CDMA) and transmit unique identification values (such as an International Mobile Subscriber Identity (IMSI) value, an International Mobile Equipment Identity (IMEI) value, and/or a Temporary Mobile Subscriber Identity IMSI value, etc.) associated with the cellular device to the communication devices 119. The communication devices 119 are configured to receive the unique identification values and determine a phone number identifying the cellular device. The communication devices 119 may also function as cellular repeaters that provide improved cellular coverage at premises 102a.

Figure 2:
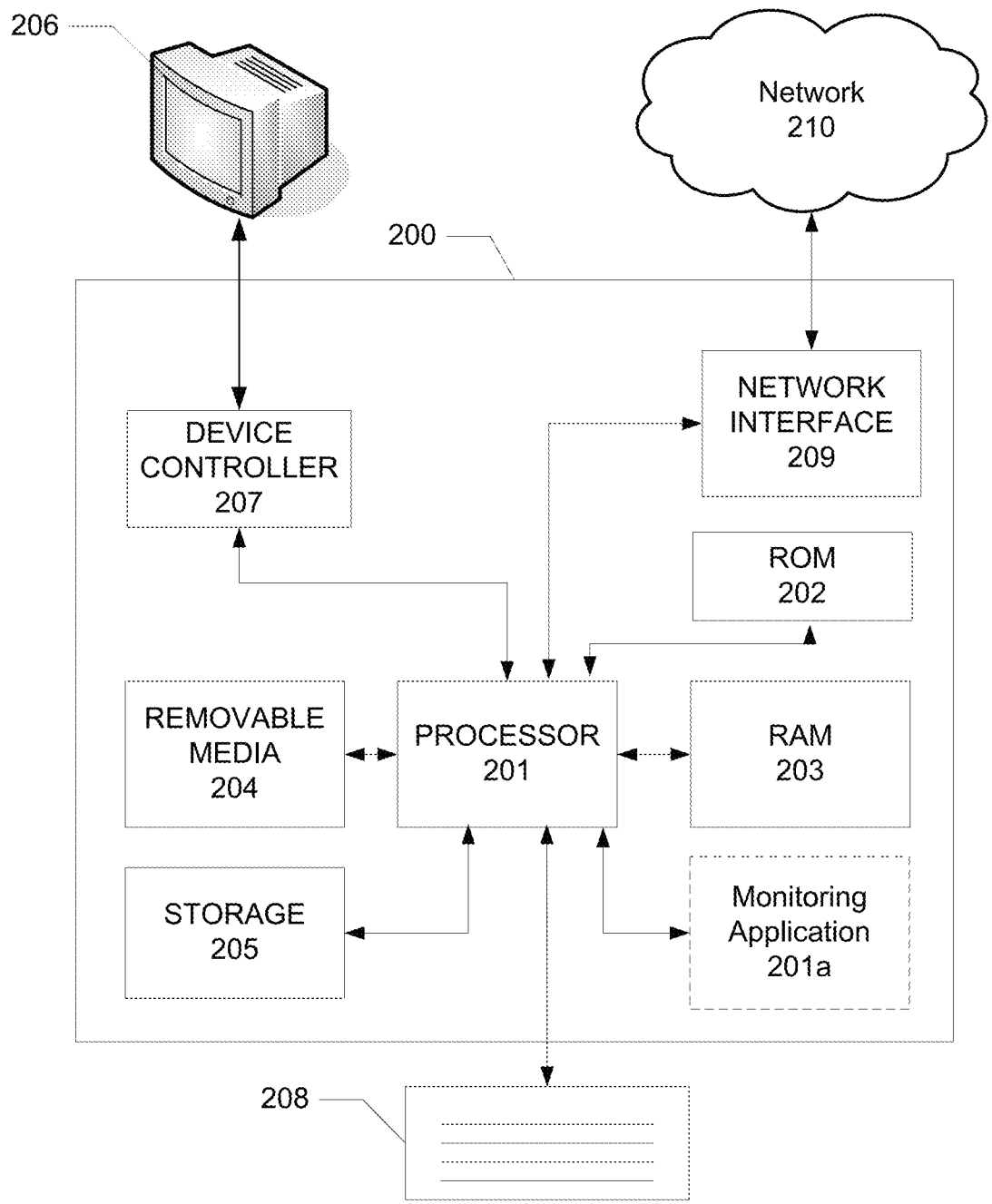
FIG. 2 shows an example computing device that can be used to implement any of the aspects, methods, servers, entities, and computing devices described herein.

FIG. 2 shows general hardware elements of an example computing device 200 that can be used to implement any of the systems, devices, and elements discussed herein and/or illustrated in the figures. The computing device 200 may include one or more processors 201, which may execute instructions of a computer program to perform any of the features described herein. In one arrangement, the processor 201 may execute instructions for a monitoring application 201a. The instructions may be stored in any type of computer-readable medium or memory, to configure the operation of the processor 201. For example, instructions may be stored in a read-only memory (ROM) 202, random access memory (RAM) 203, removable media 204, such as a Universal Serial Bus (USB) drive, compact disk (CD) or digital versatile disk (DVD), floppy disk drive, or any other desired electronic storage medium. Instructions may also be stored in an attached (or internal) storage 205 (e.g., hard drive, flash, etc.). The computing device 200 may include one or more output devices, such as a display 206 (or an external television), and may include one or more output device controllers 207, such as a video processor. There may also be one or more user input devices 208, such as a remote control, keyboard, mouse, touch screen, microphone, camera, etc. The interface between the computing device 200 and the user input devices 208 may be a wired interface, wireless interface, or a combination of the two, including IrDA interfaces, cellular interfaces, Bluetooth interfaces and ZigBee interfaces, for example. The computing device 200 may also include one or more network interfaces, such as input/output circuits 209 (such as a network card) to communicate with an external network 210. The network interface may be a wired interface, wireless interface, or a combination of the two. The interface 209 may include a modem (e.g., a cable modem), and the network 210 may include the communication links 101 discussed above, the external network 109, an in-home network, a provider's wireless, coaxial, fiber, or hybrid fiber/coaxial distribution system (e.g., a DOCSIS network), or any other desired network. The modem may be integrated with a cellular antenna. The device may be configured and/or may be able to perform the steps, methods, algorithms and/or flows described herein.

The FIG. 2 example is an example hardware configuration, although the illustrated components may be implemented as software as well, such as via an application and/or executable code executing on the device 200. Modifications may be made to add, remove, combine, divide, etc. components as desired. Additionally, the components illustrated may be implemented using basic computing devices and components, and the same components (e.g., the processor 201, the storage 205, etc.) may be used to implement any of the other computing devices and components described herein. For example, the various components herein may be implemented using computing devices having components such as a processor executing computer-executable instructions stored on a computer-readable medium, as illustrated in FIG. 2. Some or all of the entities described herein may be software based, and may co-exist in a common physical platform (e.g., a requesting entity can be a separate software process and program from a dependent entity, both of which may be executed as software on a common computing device).

One or more features described herein may be embodied in computer-usable data and/or computer-executable instructions, such as in one or more program modules, executed by one or more computers (such as the computing device 200) or other devices to perform any of the functions described herein. Generally, program modules (such as the monitoring application 201a) include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. The functionality of the program modules may be combined or distributed as desired. In addition, the functionality may be embodied in whole or in part in firmware or hardware equivalents such as integrated circuits, field programmable gate arrays (FPGA), and the like. Example data structures may be used to illustrate one or more aspects described herein, but these are merely illustrative examples.

Figure 3:
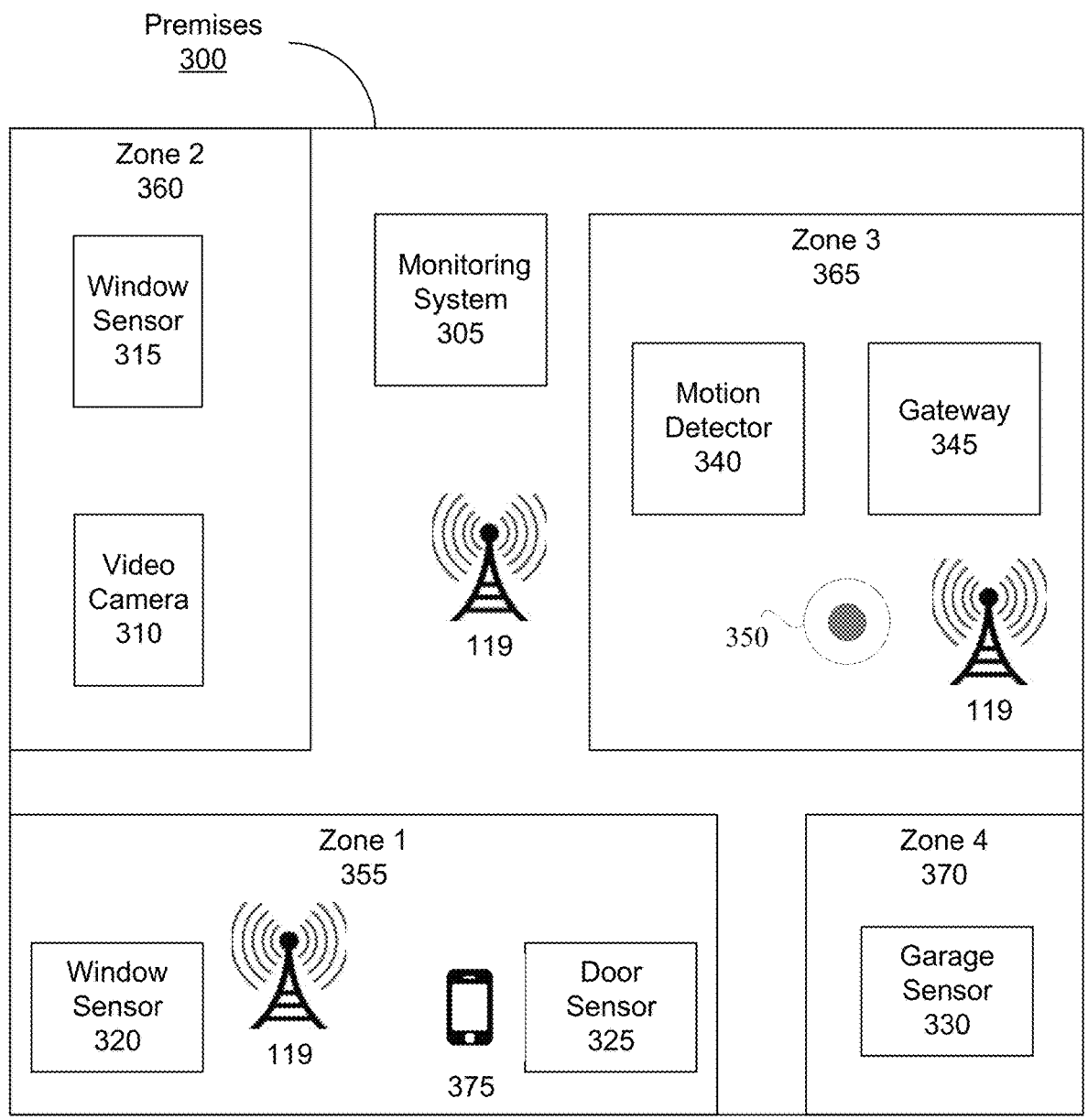
FIG. 3 shows an example operating environment in accordance with one or more aspects described herein.

FIG. 3 shows an example premises 300 (which may be similar to, and/or correspond to, premises 102 of FIG. 1). For example, the premises 300 may be a building, user residence, business, recreational facility, laboratory, manufacturing facility etc. (which may be referred to herein as a premises in a non-limiting manner). The premises 300 may extend beyond a physical barrier, such as extending beyond a wall of a house, and extending to a property line boundary, a street, an end of a yard, etc. The premises 300 may include predetermined and/or user customizable non-physical barriers or boundaries. For example, the premises 300 may be an open space that may have boundaries for a transmission and/or reception range of cellular signal strengths or other wireless communication signal strengths (e.g., Wi-Fi, Bluetooth, etc.) of the communication devices 119.

The premises 300 may include a monitoring system 305, which may be operated by or otherwise associated with an entity, such as the local office 103. For example, the local office 103 or other entity may communicate with the monitoring system 305. The monitoring system 305 may send and/or receive instructions from the monitoring application 201a via the interface 110, the interface 104 and/or the network interface 108. The premises 300 may be divided into a plurality of zones, such as zone 1 355, zone 2 360, zone 3 365, and zone 4 370. The premises 300 may include or be associated with one or more devices and/or components that may be similar to the devices and/or components in FIGS. 1 and 2. For example, the premises 300 may include the communication devices 119 that may be integrated into the monitoring system 305 or may be stand-alone devices. The communication devices 119 may be a cellular monitoring device, such as a cellular interceptor tower or microcell. The communication devices 119 may be configured to detect a wireless device 375, such as a cellular phone, or other computing device, within and/or near the premises 300.

The premises 300 may include one or more door sensors 325 that may be configured to detect whether one or more doors at the premises 300 may be open or closed. In addition, the premises 300 may include a plurality of windows. Each of the plurality of windows may be secured by associated window sensors, such as window sensor 315 and window sensor 320, which may be similar to the door sensor 325. The premises 300 may include one or more smart door locks respectively corresponding to the one or more doors. The premises may also include one or more smart window locks respectively corresponding to the one or more windows. The premises 300 may include a garage sensor 330 that is configured to detect whether a garage at the premises 300 is open or closed and/or a remotely controllable garage door opener. The premises 300 also may include a motion detector 340 that may be configured to detect user motion, and a video camera 310 that may be configured to capture videos and/or images when instructed. Premises 300 may also include one or more lights 350 that are configured to turn on or off, such as when instructed.

Any and/or all of the sensors 315, 320, 325 and 330, detectors 335 and 340, video camera 310, lights 350, the one or more smart door locks, the one or more smart window locks, and the communication devices 119 may be communicatively coupled via one or more wired and/or wireless connections to the monitoring system 305 and may comprise an IoT system. The monitoring system 305 may send and/or receive signals to and/or from the communication devices 119, the various sensors, detectors, lights and/or cameras. Any and/or all of the sensors 315, 320, 325 and 330, detectors 335 and 340, video camera 310, lights 350 and the communication devices 119 may be assigned to a specific zone of the premises 300. For example, each zone (such as zone 1 355, zone 2 360, zone 3 365, and zone 4 370) of the plurality of zones may correspond to certain alarm and/or intruder criteria that need to be met for an alert notification to be sent and/or an alarm to be triggered. Customized alarms and/or notifications may be set corresponding to each zone (such as zone 1 355, zone 2 360, zone 3 365, and zone 4 370) of the premises 300 and/or corresponding to predefined intruder criteria. For example, an intruder may happen to bring their cellular phone to the premises 300, and signals from the cellular phone may be intercepted and analyzed by the communication devices 119 at the premises 300 to determine that the intruder's cellular phone is an unknown or unregistered device. If the monitoring system 305 determines that the intruder's cellular phone is present in zone 1 355, the monitoring system 305 may send an alert notification to a registered user device informing a registered user of a presence of the intruder in zone 1 355. The monitoring system 305 may trigger a customized audible alarm in the premises, wherein the customized audible alarm is indicative of the presence of the intruder in zone 1 355 (e.g., "intruder in zone 1"). The monitoring system 305 may be coupled to one or more of the sensors 315, 320, 325 and 330, which may allow the security sensors 315, 320, 325 and 330 to be activated, de-activated, or monitored. The communicatively coupled sensors 315, 320, 325 and 330 may be sensors for collecting data, such as microphones, ambient light sensors, passive infrared sensors, or the like that may be indicative of the location and/or movement patterns of the intruder. The lights 350 may be networked and controllable by the monitoring system 305. For example, the monitoring system 305 may control the lights 350 to turn on or off if the presence of an intruder has been detected and/or during an alarm event or emergency situation.

According to some aspects, the communication devices 119 or other device may communicate on the network 100 with the local office 103 or with another entity or device. For example, the monitoring system 305 may communicate with the device 375 when the device 375 crosses a secure perimeter of premises 300 or when the device 375 enters and/or nears a door or a window. The monitoring system 305 may acquire information from the device 375. For example, the monitoring system 305 may determine, retrieve, and/or receive the IMEI, TMSI, and/or the IMSI value associated with the device 375 (e.g., a cellular device) by intercepting cellular and/or data communications between the device and one or more legitimate cellular base stations. The monitoring system 305 (and/or the local office 103) may analyze, store, and/or compare the acquired information. For example, the monitoring system 305 may compare the device 375's IMSI, the IMEI, or the TMSI values with known IMSI, IMEI and/or TMSI identities for cellular devices registered with the monitoring system 305. The monitoring system 305 may determine that the unknown device 375 is not recognized and/or may be an unauthorized device that might not have permission to cross a perimeter (e.g., a secured physical or non-physical perimeter) of the premises 300 and/or might not have permission to enter a zone within, in proximity to, or otherwise associated with the premises 300 based on determining that the unknown device 375 is not a previously detected device and/or there is no match between stored identification values of registered devices and identification values of the device 375.

In some aspects, the communication devices 119 may communicate with any device (e.g., a wireless device in proximity to the premises 300) within the communication devices' 119 range of coverage via GSM, CDMA, Wi-Fi and/or Bluetooth wireless protocols. For example, a cellular interceptor, as part of the monitoring system 305, may communicate with any cellular device within the cellular interceptor's range of coverage by emulating a legitimate cellular base station. The cellular interceptor may be configured to establish communication links between the intruder's cellular device and one or more GSM and/or CDMA cellular base stations in order to intercept and analyze any incoming and/or outgoing voice calls and/or data such as text messages, emails, etc. The communication devices 119 may be configured to determine an encryption key associated with a target cellular device. On acquiring the encryption key, the communication device 119 may be configured to forward communication signals between a cellular base station and the target device (e.g., the device 375) while encrypting/decrypting, recording and/or transmitting communication content to the monitoring system 305 and/or other servers and/or the local office 103. In some instances, the monitoring system 305 may implement voice and/or data analysis techniques to recognize words, topics, images, etc. from the communication content that may be relevant for identifying criminal intent, a plan for breaking into the premises 300, sensitive personal information associated with registered users of the premises 300, and/or other information associated with the premises 300 or residents of the premises 300 that may compromise safety of the residents.

The communication devices 119 may be configured to send and/or receive signals to and/or from one or more legitimate cellular base stations. In addition, if the monitoring system 305 determines that the suspect device 375 is a recognized device, wherein the acquired identification values match stored identification values for registered user devices, the monitoring system 305 may determine an authorization level associated with the suspect device 375 as listed in Table A below. This feature may be performed as part of step 909 in FIG. 9A and the monitoring system 305 may continue monitoring the device 375 and determine location information for the device 375 based on known signal strength triangulation techniques.

TABLE A

| Authorization Level | Permitted Zones | Permitted Time Range |
|---|---|---|
| 10 | All Zones | All Times |
| 8 | All Zones | 9am to 6pm on weekdays |
| 5 | Zones 1, 2 | All Times |
| 3 | Zones 1, 2 | 9am to 6pm on weekdays |
| 0 | None | None |

In some instances, the monitoring system 305 may call the intruder's cellular device and/or send one or more warning messages to the intruder's cellular device. The one or more warning messages may be customized to act as a deterrent for the intruder from attempting to burglarize the premises 300. For example, the communication devices 119 may set up a cellular communication link between a registered user device and the intruder's cellular device by dialing a phone number for the intruder's cellular device. The registered user device may send audible messages via the cellular communication link such as "you have been identified as an intruder," "you have no authorization for accessing the premises," "we have intercepted information uniquely identifying your phone but do not recognize your phone, please identify yourself!," "you are under surveillance, do not proceed into premises," etc. In some instances, the monitoring system 305 may send warning messages (e.g., text, SMS, images, audio, etc.) to the intruder's cellular device indicating that the cellular device might not have authorization to enter the premises 300 (or an area in proximity to the premises 300). In some cases, the warning message may include a request for security information (e.g., a security code), which may be used by the monitoring system 305 to grant access permissions to the device 375. For example, if the device 375 sends correct security information to the monitoring system 305, and/or no sensors are tripped, and/or the device 375 does not proceed further into the premises 300, the monitoring system 305 may assign the device 375 an authorization level above zero (e.g., using the Table A example above) that may be indicative of permission to access the premises 300 or certain zone of the premises 300 (such as the zone 1 355, the zone 2 360, the zone 3 365, or the zone 4 370). In such cases, because the monitoring system 305 received the correct security code from the device 375, the monitoring system 305 may determine that there might not be threat situation present and may determine no additional alarms or detectors need to be activated.

If the monitoring system 305 determines that the device 375 may be an unauthorized device and/or the correct security information is not received, the monitoring system 305 may trigger an alarm and/or provide an intruder alert notification, such as playing an audible alarm, sending or generating an alarm message, turning on/off the lights 350, turning on the video camera 310, etc. The monitoring system 305 may establish wireless communication channels with the device 375 over unsecure wireless networks via Wi-Fi, Bluetooth, etc. The monitoring system 305 may send a text message, via cellular protocols and/or Wi-Fi protocols, to the device 375 warning the device 375 to leave the premises 300. In some instances, the monitoring system 305 may call the device 375 and transmit a recorded warning message to the device 375 if the call is answered. The monitoring system 305 may determine a location of the device 375 using any known signal strength triangulation techniques via the communication devices 119 that may utilize GSM, Wi-Fi, Bluetooth, etc. wireless communications protocols. The monitoring system 305 may also determine a location of the device 375 based on GPS coordinates received from the device 375. By monitoring changes in the location of the device 375, determining movement patterns of the device 375 and comparing the movement patterns of the device 375 to predefined movement patterns, the monitoring system 305 may determine that the audible alarm failed to deter the intruder. For example, if the monitoring systems 305 determines that the intruder's cellular device is moving towards an office in the premises 300 instead of exiting the premises 300, after playing an audible alarm (such as "you are not authorized to access the premises, please identify yourself," etc.), the monitoring system 305 may determine that the audible alarm has failed to deter the intruder. The monitoring system 305 may proceed to compare the response of the intruder to predefined criteria and determine a high threat score associated the device 375 indicative of a genuine threat situation as listed in Table B below. A threat score of 10 may be the highest possible threat score and a threat score of 1 may be indicative of the lowest possible threat score based on predefined settings and/or user customizable settings.

In some instances, an alarm may be triggered by the monitoring system 305 in response to analyzing cellular and/or data communications sent and/or received by the device 375. For example, voice recognition techniques may be utilized in order to recognize specific words in voice communications to or from the device 375, wherein the specific words are associated with predefined criteria for criminal intent (such as words describing fire arms, break-in, picking locks, hacking, etc.). Similarly, if analysis of data transmissions (such as text messages) associated with the device 375 recognized the specific words associated with criminal intent, the monitoring system 305 may determine a threat score associated with the device 375 as listed in Table B below.

The analysis of the cellular and/or the data communications and/or received by the device 375 that reveal the specific words associated with criminal intent may allow the monitoring system 305 to identify a phone number and other unique identification values for another unregistered device in communication with the device 375. For example, the monitoring system 305 may determine that the suspect unregistered device is a device associated with an accomplice of the intruder if voice and/or data communications between the device 375 and the other unregistered device comprise words indicative of criminal intent. The monitoring system 305 may access a database storing the words indicative of criminal intent such as break-in, rob, gun, open window, assault plan, etc. In such situations, the monitoring system 305 may assign a threat score corresponding to predefined criteria associated with the phone number of the accomplice's device as listed in Table B below. The monitoring system 305 may search databases of criminal records for determining a match between phone numbers of the device 375 and/or the other unregistered device and stored phone numbers associated with known criminals. The threat scores of Table B may be adjusted lower or higher based on determining whether a match between the phone numbers of the device 375 and/or the other unregistered device and the stored phone numbers associated with the known criminals is found. An aggregate threat score associated with the device 375 may be determined based on a number of predefined criteria met. If the accomplice's device crosses a secure perimeter of the premises 300, the monitoring system 305 will determine entry of the accomplice's device by recognizing the stored phone number and/or the cellular device identification values. The monitoring system 305 may then increase the threat score assigned to the accomplice's phone as listed in Table B.

TABLE B

| Predefined Criteria | Threat Score |
| --- | --- |
| Suspect device present near door for 1 minute, no alarm tripped | 2 |
| Suspect device present near door for 10 minutes, no sensor tripped | 6 |

TABLE B-continued

| Predefined Criteria | Threat Score |
| --- | --- |
| Suspect device present near door, sensor tripped | 8 |
| Cellular communications to and/or from the device 375 that may be indicative of criminal intentions. | 10 |
| Cellular communications to and/or from the device 375 that may be indicative of the presence of one or more accomplices. | 5 |
| Determining the entry of devices associated with the one or more accomplices into the premises. | 10 |

As listed in Table B, the predefined criteria may be associated with the monitoring system 305 not receiving the security information within a predetermined time period, location information suggesting movement of the device 375 (e.g., towards the interior of the premises), tripping or activating one or more sensors (e.g., the sensors 315, 320, 325 and 330), notifying one or more other devices 375 that may have crossed a secure perimeter of the premises 300 (e.g., accomplices that are identified as having crossed a secure perimeter of the premises), determining communication between devices 375 (e.g., such as for help in breaking into premises 300), other user defined criteria and behavioral patterns of the users of the monitoring system, and the like. Each of the predefined criteria may be used in evaluating the threat score associated with the device 375 and selecting a response. For example, if a cumulative threat score of 8 has been determined, the monitoring system 305 may proceed to step 921 or step 929 of FIG. 9B and/or lock doors that are present along a path the intruder may take to users present at the premises 300. In another example, this feature can be performed as part of step 916, or after step 921 of FIGS. 9A-9B.

In some instances, a predefined and/or user customizable combination of the predefined criteria may be assigned a default and/or user customizable corresponding threat score respectively. For example, a threat score associated with two predefined criteria being met (such as the monitoring system 305 not receiving a security code within a predetermined time period and the location information suggesting movement of the device 375 towards the interior of the premises 300) may be higher than a threat score associated with one predefined criteria being met (such as the monitoring system 305 not receiving the security code within the predetermined time period). In some other instances, certain predefined criteria may be assigned a much higher threat score than the remaining predefined criteria. For example, a threat score associated with the location information suggesting movement of the device 375 towards the interior of the premises or the tripping or activating of the one or more sensors 315 may be assigned a higher threat score than the monitoring system 305 not receiving the security code within the predetermined time period.

The monitoring system 305 may set up an emergency wireless network at the premises 300 in order to establish another communication pathway with any cellular device and/or other wireless device that may be associated with an intruder. This feature can be performed as part of step 917, or after step 919. The emergency wireless network may be configured to determine MAC addresses for any computing devices (e.g., laptops, tablets, cellular devices, etc.) associated with the intruder. For instance, some intruders may carry a cellular phone that is configured to automatically attempt to connect with detected wireless access points (e.g., IEEE 802.11 hotspots such as XFINITY® Wi-Fi). The interface 110 of the premises 300 may be capable of automatically creating new temporary and unsecured wireless networks on the fly, when a suspected intruder's device 375 is detected, in which case the device 375 may establish a communication channel with the local office 103 and/or a monitoring entity via the network interface 109. For example, the monitoring system may gain control over one or more software applications installed in the device 375 that may enable the monitoring system 305 to remotely control one or more features of the device 375 and/or gain access to data stored in the device 375. In some instances, the monitoring system 305 may cause the device 375 to connect to the temporary wireless networks (e.g., by providing the device 375 the temporary wireless network access credentials, etc.) and/or share information stored in the device with the monitoring system 305 via the temporary wireless network. In some instances, the device 375 may automatically connect to the temporary and the unsecured emergency wireless network if the device 375 is configured to automatically connect to available Wi-Fi hotspots. The monitoring system 305 may send warning messages (such as SMS, audio, text, images, etc.) to the device 375 and/or any wireless device associated with the intruder via the temporary emergency wireless network and/or the one or more software applications. Additionally, while FIG. 3 shows a particular number and configuration of communication device 119 and sensors 315, 320, 325 and 330, which may be included in a monitoring system deployed at a premises 300 in one embodiment, any number of communication devices 119, sensors (e.g., 315, 320, 325, 330), as well as any number of monitoring systems 305 and/or different types of communication devices 119, cellular antennas, sensors, detectors, lights and/or cameras may be included in a monitoring system 305.

In one arrangement, the monitoring system 305 may be implemented in the computing device 200, for example, with many functions disclosed herein implemented by the monitoring application 201a. The monitoring system 305 may be implemented as part of the gateway 111 (FIG. 1). For example, the gateway 111 may be communicatively coupled to the sensors 315, 320, 325 and 330, which may allow the gateway 111 to activate, de-activate, and/or monitor the sensors 315, 320, 325 and 330 and/or control the smart door and window locks. While the description above focuses on the door sensors 325 and the window sensors 315 and 320, many other sensors and devices may be communicatively coupled to the monitoring system 305 and/or to the gateway 111.

One or more video cameras 310 or sensors or motion detectors 340 may be located so as to monitor an access location of the premises 300, such as a door or a window, or other traffic areas of the premises 300. According to various techniques disclosed herein, images, sounds, and other data captured by the one or more video cameras 310 or other sensors or the motion detectors 340 may be transmitted by the monitoring system 305, for example, as an email, text message, or through a software application to, for example, a remote or local user or device, for analysis and/or a predetermined and/or dynamically determined action.

The monitoring system 305 may be configured to learn the behavior and activities of the users and/or devices of the monitoring system 305 and or other residents of the premises 300, such as children and pets, in order to adjust alarm settings or modes and to determine when an alarm should be triggered. The monitoring system 305 may be configured to learn by software stored, for example, on the RAM 203 or other appropriate memory or storage device in the computer device 200. The learning process may include, for example, monitoring the activities of users of the monitoring system 305 and other individuals within or near the premises 300 based on the date, time of day, any calendar entries, etc. This feature can be performed as part of step 916, or after step 920 of FIGS. 9A-9B. For instance, one or more users of the monitoring system 305 may regularly enter the premises 300 at a particular time of day (e.g., arriving home from work, and/or maid arrival). The monitoring system 305 may keep track of the users' interaction with the alarm system via associated user devices and perform steps for the users, without the users' request. Continuing the example, if the monitoring system 305 determines that a specific user in the monitoring system 305 routinely opens a garage door at 5 pm, the monitoring system 305 may automatically disarm the alarm around 5 pm (e.g., 15 minutes before 5 pm, 15 minutes after 5 pm, etc.) when that specific user arrives at the premises 300. This example may or might not use facial and/or biometric identification and may be user selectable. In a similar example, if the monitoring system 305 determines that all users of the monitoring system 305 routinely leave the premises 300 at 7 am, the monitoring system 305 may automatically arm the alarm and/or activate the sensors 315, 320, 325 and 330 at a time when the users leave the premises 300. Further, the monitoring system 305 could check internal sensors to ensure no other individuals are home at the time via internal sensors.

From the example diagram of FIG. 3, various features may be realized. For example, the sensors 315, 320, 325 and 330, the video cameras 310, the lights 350, the detectors 335 and 340, and the monitoring system 305 may be communicatively coupled to a user interface device, such as the television 112 (or another type of display). Through the user interface device (e.g., the television 112, the laptop 115 and/or the wireless device 118) an authorized user may configure or control any of the devices associated with the monitoring system 305. Another example feature may include transmitting (e.g., streaming) data (e.g., pictures, video, audio, etc.) from the one or more video cameras 310 to a device, such as any of the devices in FIG. 1 or 3.

Figure 4:
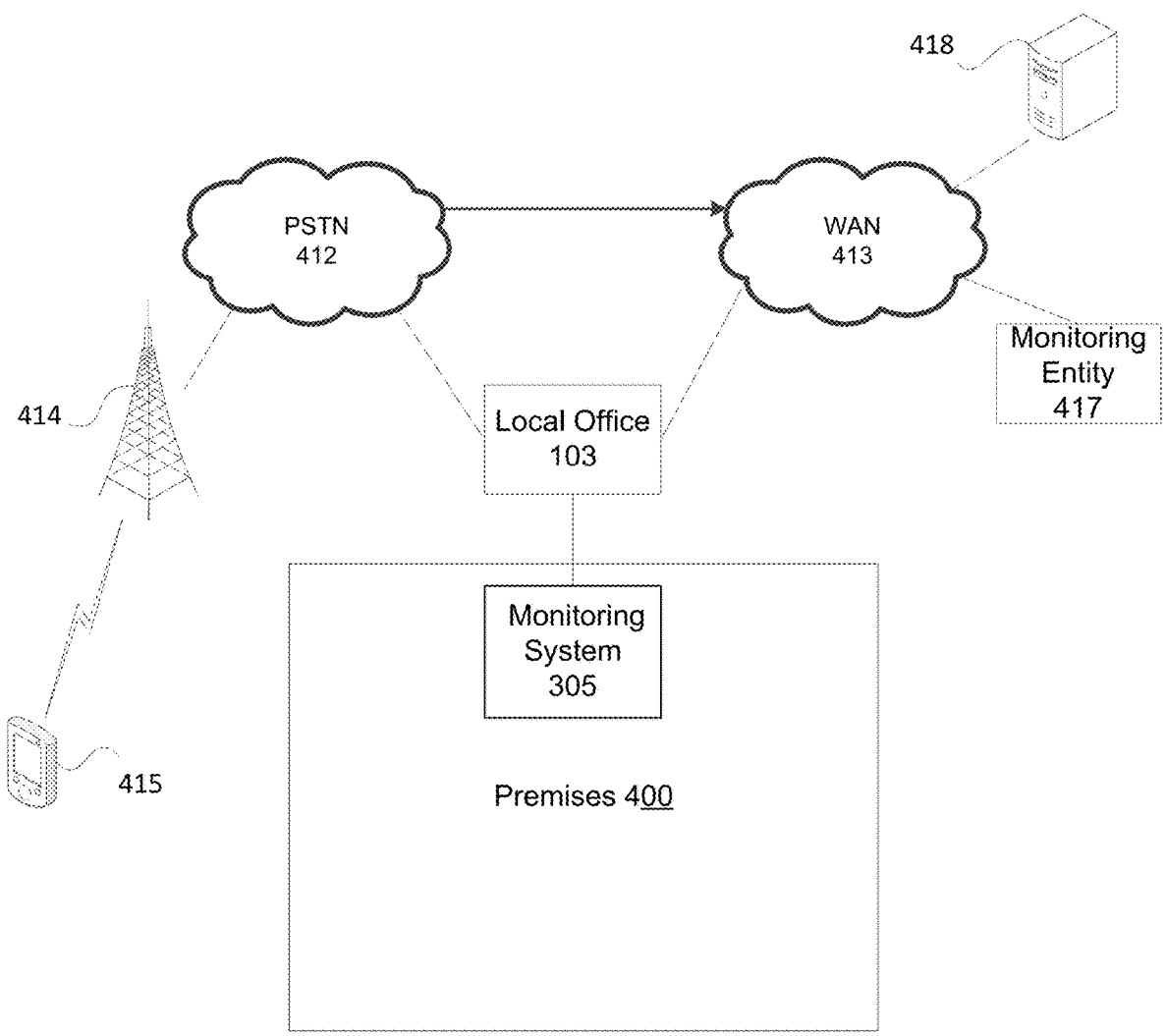
FIG. 4 shows an example operating environment in accordance with one or more aspects described herein.

FIG. 4 shows an example operating environment in which various features described herein may be performed and implemented. The environment may include premises 400 (which may be similar to, and/or correspond to premises 102 of FIG. 1) and the local office 103. FIG. 4 also shows that the monitoring system 305 may communicate with an external network, such as the local office 103. The monitoring system 305 may transfer alert signals or alert notifications indicating unauthorized cellular devices (e.g., device 375) and/or alarm events upstream to the local office 103. The unauthorized devices 375 may be detected via establishing a communication channel between the device 375 and the communication device 119.

Referring to FIG. 4, when an alarm event or alert notification is triggered, the local office 103 may record the alarm event (e.g., store information identifying the sensor(s) that were tripped, their location, recording video and/or audio showing the event that occurred, etc.), determine an appropriate reaction, and/or transmit a signal to an external network, such as a public switched telephone network PSTN 412, the network 103, the network 109, and/or a wide area network WAN 413. In one embodiment, the monitoring system 305 may communicate directly and/or indirectly with and/or via the networks 103, 109, 412 and/or 413. An example of such a connection, may be a connection between the monitoring system 305, the local office 103, and/or the PSTN 412, that may be configured to send data in a suitable form such as alert notifications to a cellular base station 414 and/or other suitable network and ultimately to one or more designated wired and/or wireless devices 415 (e.g., smartphone, tablet, etc.). Alert notifications from the local office 103 may be sent to one more devices 415 in the form of a direct and/or indirect communication such as an email, text message, or phone call or through a software application. Also, through the PSTN 412, the local office 103 may connect to a public safety answering point (PSAP). Thus, the local office 103 may alert authorities of the alarm, so that the authorities may be dispatched to the premises 400.

Additionally, or alternatively, the local office 103 may transfer an alert signal via one or more networks such as the WAN 413 (e.g., the Internet) to a monitoring entity 417 and/or to a web portal server 418. According to some aspects, the entity 417 and/or the server 418 may be part of the local office 103. The monitoring entity 417 may be the same entity as the local office 103 or a third party entity. The monitoring entity 417 may be responsible for monitoring the premises 400. This may include responding to alert signals received when the security system detects an alarm event. For example, the monitoring entity 417 may contact the appropriate authorities to dispatch the appropriate authorities to the premises 400. Or, when an alert signal is transferred to the monitoring entity 417, this may prompt a representative or automated system of the monitoring entity 417 to contact (e.g., via a call, e-mail, text, and/or application) the premises 400 or another designated entity (e.g., via a telephone number and/or other contact designation) to confirm the correctness of the alarm event and/or desired response to the alarm event. Also, the monitoring entity 417 may communicate with one more wired and/or wireless devices (e.g., 415, 112, 113, 114, 115 and 118, etc.), such as via an alert notification, an email, text message, phone call, media content and/or through a software application, etc.

The web portal server 418 may be a computing device capable of providing a web portal through which users may access information regarding the security of the premises 400. Users may log-on and/or gain access to the web portal provided by, for example, the web portal server 418 and view an alarm event and/or information related to an alarm event, such as what sensor was triggered and when the sensor was triggered and/or associated dated related to the alarm event. Also through for example, the web portal, a user may be able to view video of the premises 400 captured by the video camera 310 and/or may be able to check the status of the security system, to see if the security system may be armed. Where the web portal server 418 is coupled to a suitable network such as the WAN 413 (e.g., the Internet), the web portal for the premises 400 may be accessed using any device that can connect to the network, such as a smartphone, tablet, laptop, etc. The web portal may also be used to customize settings, such as schedules, to indicate when and how the monitoring system 305 should operate. For instance, using the web portal, a user via a device may be able to indicate certain times during which the monitoring system 305 should automatically activate/ and or de-activate itself. The web portal may be coupled to the user's calendar and provide additional inputs to the activating and/or de-activating of the monitoring system. Additionally, the monitoring entity 417 and/or the web portal 418 may use these inputs to determine that a user may be outside of the premises 400 and might not have activated the monitoring system 305.

The web portal 418 may permit a user to monitor multiple premises 400. That is, a single user interface (e.g., a graphical user interface, a display screen, etc.) may allow a user via a user device to view status information, video, security settings, sensor information, video camera recordings, etc. for a plurality of premises 400. Having a single interface may be desirable to users who have multiple security systems at various remote locations, such as users who own multiple homes or businesses. According to some aspects, a plurality of interfaces may be implemented.

When an alarm event or intruder is detected, the local office 103, the monitoring authority 417, and/or the monitoring system 305 may transmit information regarding the alarm event to one or more users and/or devices, which may allow users to determine what may have triggered the alarm. For example, information about an alarm event may be transmitted to registered user devices (such as device 415), via the web portal server 418, identifying the cellular device that was detected, providing information associated with an intruder carrying the cellular device, providing location information associated with the cellular device, providing information associated with one or more accomplices of the intruder, sensor(s) that were tripped, when they were tripped, their location, recording video and/or audio showing the event that occurred, the locations of other individuals in the home or business premises, etc. A user response from the registered user device and/or a predefined user configurable response application may be able to use such information regarding the alarm event to determine whether the alarm may be a false alarm or whether authorities should be notified and dispatched.

The local office 103, the monitoring authority 417, and/or the monitoring system 305 may transmit information giving one or more users and/or associated devices the option to clear the alarm event as a false alarm. For example, information may be transmitted to the user's cellular device 415 via a cellular base station 414 or via the web portal server 418 enabling the user and/or associated device 415 to disarm the notification. The local office 103, the monitoring entity 417 and/or the monitoring system 305 may have access to a database storing a confidential passphrase and/or other biometric identification discussed herein. The user and/or associated device 415 may send the confidential passphrase and/or other biometric identification to the local office 103, the monitoring authority 417, and/or the monitoring system 305 to allow verification of an identity of the user. The local office 103, the monitoring authority 417, and/or the monitoring system 305 may disarm the notification based on verifying that the confidential passphrase and/or other biometric identification sent by the user and/or associated device 415 matches the confidential passphrase and/or other biometric identification stored in the database.

Figure 5:
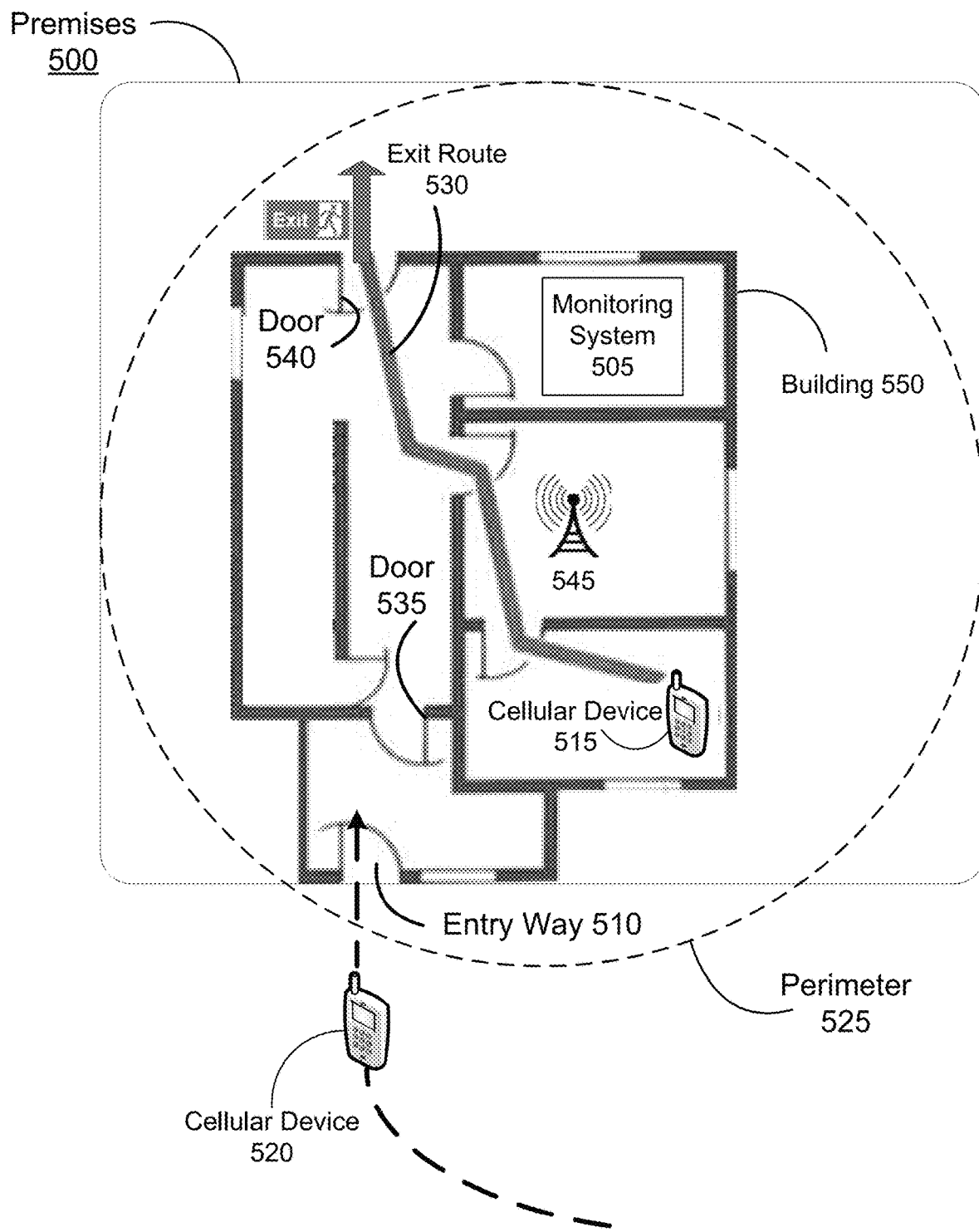
FIG. 5 shows an example operating environment in accordance with one or more aspects described herein.

FIG. 5 shows an example monitoring system 505 (which may be similar to, and/or correspond to the monitoring system 305 in FIGS. 3-4) deployed at a premises 500 (which may be, be similar to, and/or correspond to the premises 300 in FIG. 3). As shown in FIG. 5, the premises 500 may include a building 550, an entry way 510, a cellular interceptor 545 (which may be similar to and/or correspond to the communication devices 119 of FIGS. 1 and 3, a microcell, an LTE antenna, etc.) and doors (e.g., door 535 and door 540). In some instances, the cellular interceptor 545 may comprise an array of one or more communication devices 119 (for e.g., an array of one or more microcells, LTE antennas, etc.). The array of the one or more communication devices 119 may be configured to determine a more accurate location of a cellular device at the premises 500 based on establishing one or more communication channels with the cellular device and using known signal strength triangulation techniques. According to some aspects, the doors 535 and 540 may be remotely controllable as part of an IoT system associated with the building 550 and/or remotely controllable by the monitoring system 505. A perimeter 525 may be associated with the premises 500. In some instances, an area encompassed by the perimeter 525 may be based on a range of coverage associated with the cellular interceptor 545, a layout of the premises 500, a layout of the building 550 and/or other customizable user settings. A registered cellular device 515 which may belong to or otherwise be associated with a resident or user of the premises 500 may be present at the premises 500. The monitoring system 505 may not trigger an intruder alert notification and/or an alarm because the monitoring system 505 recognizes a phone number and/or other unique identification values of the registered cellular device 515.

Figure 9A:
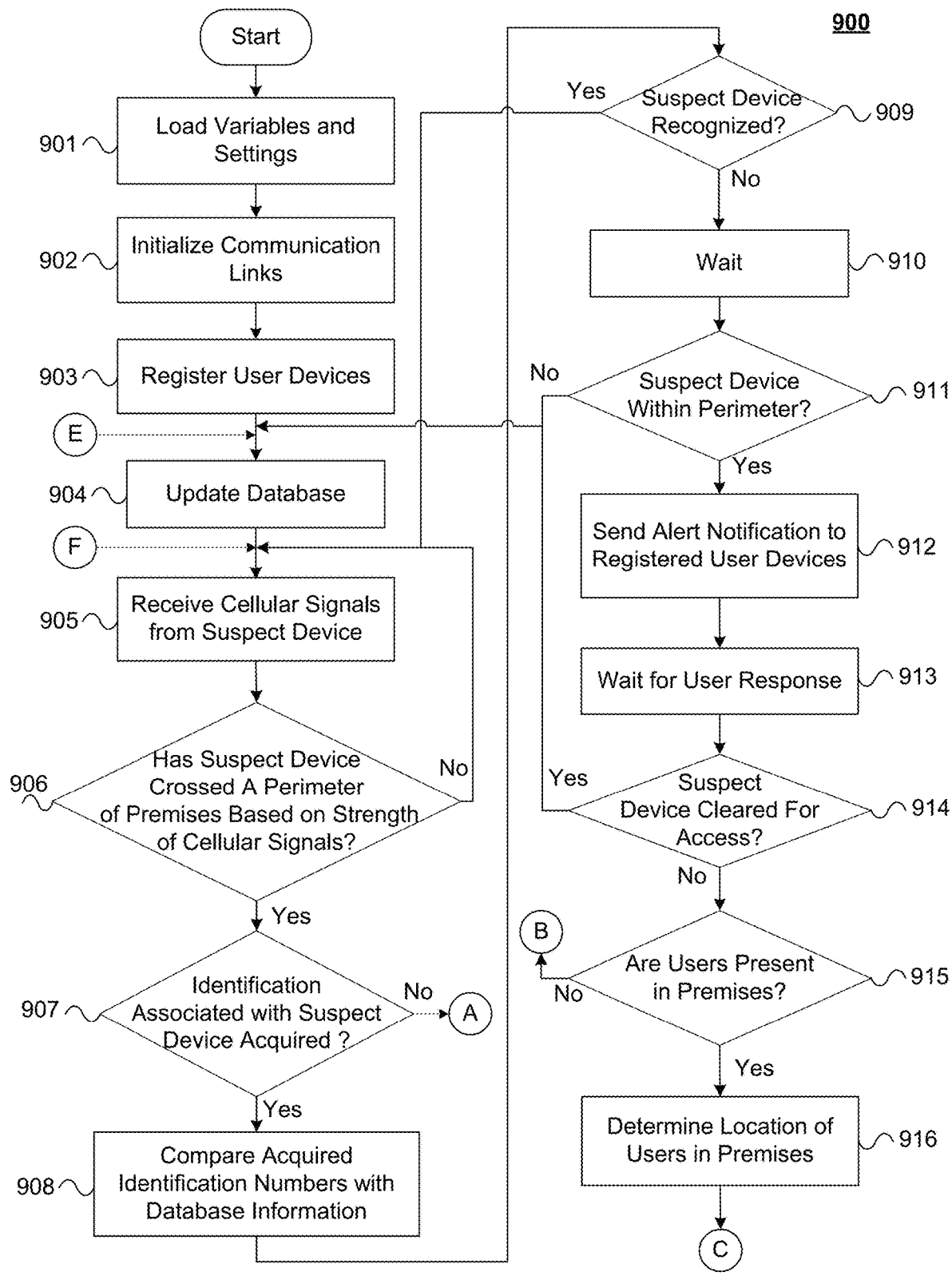
FIGS. 9A, 9B and 9C collectively show a flow diagram of a method in accordance with one or more aspects described herein.

According to some aspects, the monitoring system 505 may detect cellular signals from a suspect device 520 (e.g., a cellular device) and may analyze a strength of the cellular signals associated with the suspect device 520 to estimate a location and/or a movement pattern of the suspect device 520 (e.g., at step 906 of FIG. 9A). In some aspects, the monitoring system 505 may estimate the location of the suspect device based on known signal strength triangulation techniques. If the monitoring system 505 determines that the location of the suspect device 520 is outside of the perimeter 525, the monitoring system 505 may continue monitoring the suspect device 520 for location information. If the monitoring system 505 determines that the location of the suspect device is within the perimeter 525, the monitoring system 505 may establish a communication link with the suspect device 520 (e.g., by simulating a typical cell tower, or by establishing a Wi-Fi connection, etc.) and may acquire device identification values, such as a phone number, an IMSI, an IMEI, and/or a TMSI value associated with the suspect device 520 (e.g., in which case the cellular interceptor 545 emulates a legitimate cellular base station and the suspect device 520 communicates with the cellular interceptor 545 as if the cellular interceptor 545 were a legitimate cellular base station). In some instances, a MAC address associated with the suspect device 520 may be acquired if the suspect device 520 enters a range of coverage of a local Wi-Fi signal associated with the premises 500 (e.g., as part of IEEE 802.11 Wi-Fi signaling, the suspect device 520 may provide the MAC address to the communication devices 119 that may act as Wi-Fi hotspots).

The monitoring system 505 may determine whether the acquired phone number, the IMSI, the IMEI, the TMSI values and/or the MAC address correspond to a registered user device associated with the premises 500 (e.g., at step 908 of FIG. 9A). If the suspect device 520 is determined to be a registered user device, the monitoring system 505 may perform actions, such as opening a front gate to allow access to the entry way 510, opening a garage door, opening the door 535, and/or de-activating a front door alarm sensor, etc. If the monitoring system 505 determines that the suspect device 520 is not a registered user device, the monitoring system 505 may trigger an intruder alert notification, trigger an alarm at the premises 500, track the location of the suspect device 520, and/or make decisions about how to respond to the location of the suspect device 520. For example, the monitoring system 505 may close the door 535 to prevent the suspect device 520 from proceeding into the premises 500. In other instances, the monitoring system 505 may determine that a current location of the registered user device 515 is a room near the entry way 510. The monitoring system 505 may dynamically determine a safe escape route 530 based on the determined location of the suspect device 520 and send the safe escape route 530 to the registered user device 515 to guide a user associated with the device 515 away from the entry way 510 and towards the door 540. In some instances, the monitoring system 505 may close the door 540 after the user has exited the building 550. The monitoring system 505 may close one or more doors of building 500 to trap the intruder in the building 550.

The monitoring system 505 may monitor and/or activate one or more sensors within or near the premises 500. In some examples, the monitoring system 505 may control one or more networked lights, doors, detectors and/or cameras within or near the premises 500 in order to impede progress of the intruder into the premises 500, deter the intruder and/or assist in the safe evacuation of one or more users from the premises 500.

The monitoring system 505 may transmit exemplary notifications to a user device (e.g., the devices 112, 115, 118, 515, etc.) via any suitable mechanism such as a software application. The notifications may include the acquired identification values associated with the suspect device 520, a description of an alarm triggered, and/or sensors tripped in the premises 500. According to some aspects, the description of the alarm may identify a location of the suspect device 520 (e.g., which zone, such as the zones 1-4 in FIG. 3, that the suspect device is located in), the sensor(s) that may have been tripped, when sensors may have been tripped, video and/or audio information from the tripped sensors or cameras at the premises 500. In some instances, the notifications may give a user the option to clear the intruder alert as a false alarm and/or may request entry of a confidential passcode, and/or other biometric entry. Successful entry of a user's passcode and/or other biometric criteria may clear the alarm and may authenticate access to the user's confidential passphrase.

Alert notifications may be tailored depending on the location of users in relation to the premises 500. For example, if the monitoring system 505 determines that one or more users are present within or near the premises 500 when an intruder is detected (e.g., via the suspect device 520), the monitoring system 505 may provide the one or more users (e.g., via an associated device, sensor, or other notification) with information associated with the intruder of the device 520. For example, the monitoring system 505 may provide to one or more users of the monitoring system 505 (e.g., via an associated device) information pertaining to a relative location with respect to the intruder's location. The one or more users may be provided information for a safe exit route 530 based on the relative locations of the one or more users. As another example, if an intruder and/or an alarm event is detected, and the monitoring system 505 may determine that one or more of the users associated the monitoring system may be within 5 miles of the premises 500, alert notifications may be sent to the users, via associated user devices, that are within 5 miles of the premises 500, directing the users to stay away from the premises 500 until the intruder alert and/or alarm event has been resolved. In another example, if an alarm event is detected, the system may determine the location of the users of the monitoring system 505 so the alert notifications may contain information about the locations of the one or more users of the monitoring system 505. For example, if the notification sent to the primary user indicates an intruder may be in the premises 500, the system may be configured to, and/or the primary user may choose to, send alert notifications to all and/or selected users of the monitoring system 505 near the premises 500 stay away until the alarm event has been cleared. For example, after review of internal monitoring footage and/or communication with the individual in the premises, the primary user may clear the event as a false alarm.

The monitoring system 505 may use predetermined criteria to determine when an alarm should be triggered in order to reduce the amount of false alert notifications. For example, an alarm event in monitoring system 505 may be triggered when there is a deviation from a predefined set of criteria as listed in Table A. The predetermined criteria can apply to one or more sensors within or near the premises 500, and may include a combination of sensor data. For example, the monitoring system 505 may be configured to trigger an alarm event if no users of the monitoring entity 417 are within or near the premises 500.

In another example, the monitoring system 505 may be configured so that an alarm event might not be triggered after a user of the monitoring system 505 comes within a predetermined distance of the premises 500 during a specific time of day (e.g., returning from work). In another example, the monitoring system 505 may be configured to accept biometric identification data for one or more individuals that may de-activate the intruder alert and/or update the authorization level of the detected cellular device. The updated authorization level may be temporary. For example, a user may grant cellular devices associated with construction workers temporary access permissions to the premises 500 for a predefined time duration of two weeks as shown in Table C below. As another example, a user may grant cellular devices associated with a family member access (e.g., a more permanent or long-term access) to the premises 500 by adding IMSI, IMEI or TMSI values associated with the corresponding cellular devices to a list of cellular devices registered with the monitoring system 505 and/or the monitoring entity 417.

TABLE C

| Device | Designation | Access to Premises | Zone Access |
| --- | --- | --- | --- |
| Recognized | Family | Yes | All zones |
| Recognized | Friend | Yes | All zones |
| Recognized | Resident | Yes | All zones |
| Recognized | Neighbor | No | Zones 1, 2 and 3 |
| Recognized | Construction Worker | Sep. 1, 2016-Sep. 14, 2016 | Zone 1 only |
| Unrecognized | Intruder | No | None |

The local office 103, the monitoring authority 417, and/or the monitoring system 505 may be configured to cancel an intruder alert, send an alarm notification to one or more users, or notify and dispatch authorities after determining a threat score associated with the intruder indicates a legitimate break-in, burglary or intruder alert and likely not a false intruder alert. For example, the local office 103, the monitoring authority 417, and/or the monitoring system 505 may be configured to determine a threat score by analyzing information relating to the triggering event and comparing the information to predefined criteria. Information about the triggering event may include information relating to the sensor(s) that were tripped, when the sensor(s) were tripped, the location of the sensor(s), recording video and/or audio showing the event that occurred, the locations of other individuals in or at the premises 500, etc. If the local office 103, the monitoring authority 417, and/or the monitoring system 505 determines that the threat score is greater than 5, for example, an alarm notification may be sent to one or more users, and/or authorities may be notified and dispatched. If the local office 103, the monitoring authority 417, and/or the monitoring system 505 determines that the threat score is lower than 5, for example, the local office 103, the monitoring authority 417, and/or the monitoring system 505 may send a notification informing the one or more users of the triggering event, the threat score for the triggering event and may wait for a user input. The user input may be configured to de-activate the intruder alert notification in the event that the user recognizes an individual associated with the cellular device. The local office 103, the monitoring authority 417, and/or the monitoring system 505 may also be configured to de-activate the intruder alert if the threat score is too low. A user of the monitoring system 505 may configure the monitoring system 505 to retain default threat score settings and/or customize the threat score settings. In some instances, a threat score below 5 may indicate that alert notifications need not be sent to all users of the monitoring system 505 and may indicate that alert notifications may be sent to primary users of the monitoring system 505. In some instances, a threat score below 10 may indicate that alert notifications be sent to all users of the monitoring system 505.

When engaged by the user (e.g., an owner of the premises 500), the wireless device 515 may provide or otherwise display (e.g., via a software application) an initial screen or graphic on the wireless device 515 relating to the monitoring system 505. The monitoring system 505 and software application may be configured so that the initial screen presented on a user device (e.g., 515, 415, 115, 118) may be dependent on the state of the monitoring system 505. For example, when a user engages the software application on the user device (e.g., 515, 415, 115, 118), the monitoring system 505 may determine the current state of sensors, detectors, etc. within or near the premises 500, e.g., whether the sensors are activated, de-activated, etc. The software application on the wireless device 515 may present a screen and/or associated graphic/video to the user depending on which state of the monitoring system 505 is in at that time. For example, if an alarm is active, the software application on the user device (e.g., 515, 415, 115, 118) may present the user a screen that allows the user to disarm/cancel an alarm and/or choose the option to review the activities within the home. In another example, if the monitoring system 505 determines that the premises 500 is in a secure state (e.g., monitored and no active alarms), the wireless device 515 may present to the user a screen that shows the current state of the home and/or allow the user via an associated user device to view images from the active monitoring cameras. In another example, if the monitoring system 505 determines the premises 500 is in an unmonitored state (e.g., disarmed, not configured, de-activated, etc.), the device (e.g., 515, 415, 115, 118) may present the user a screen prompting the user to activate the monitoring system 505.

Figure 6:
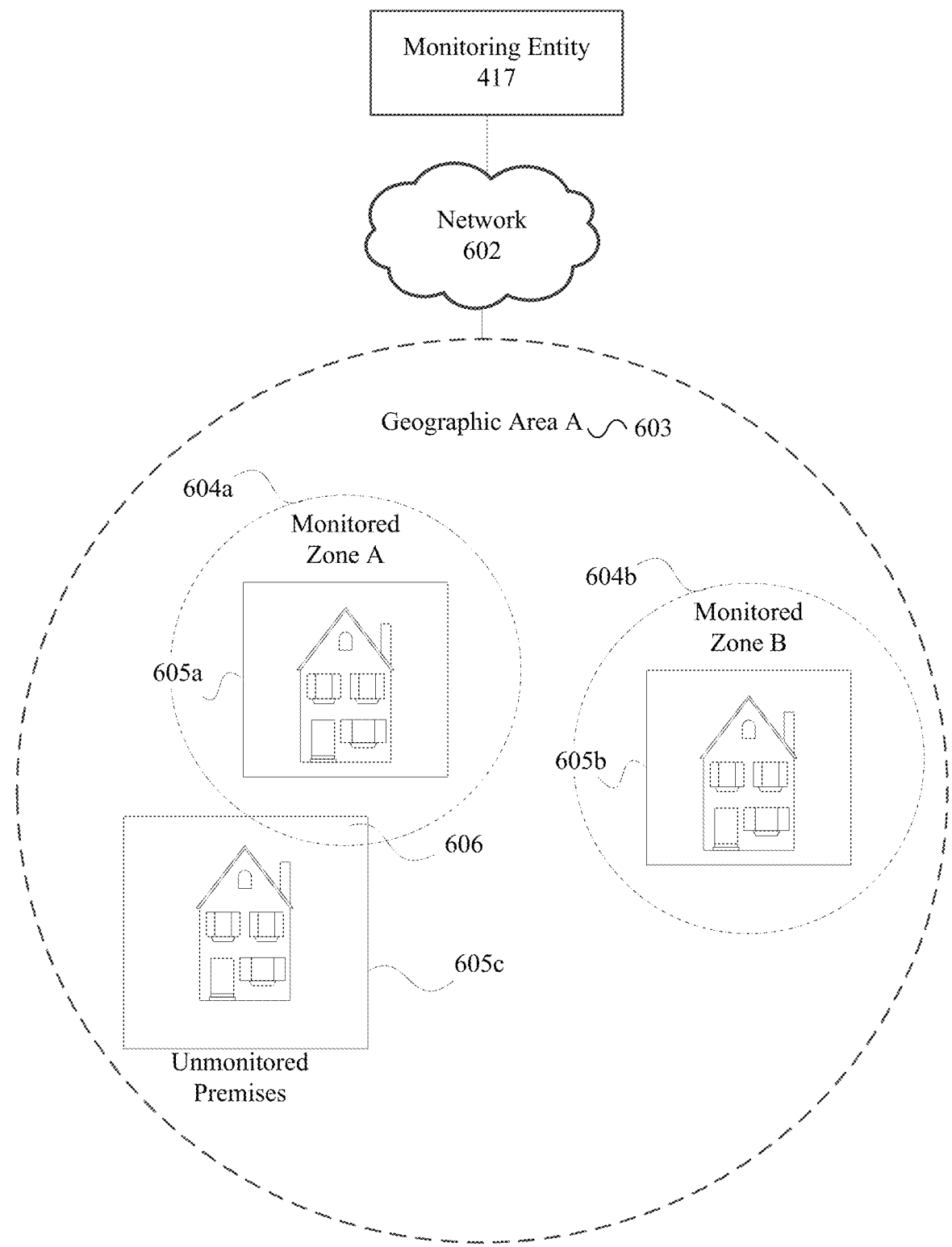
FIG. 6 shows an example operating environment in accordance with one or more aspects described herein.

FIG. 6 shows a monitoring entity 417 (which may be similar to, and/or correspond to the monitoring system 305 in FIG. 3 and/or the monitoring system 505 in FIG. 5) comprising one or more monitored zones, such as zone A 604a and zone B 604b, associated with one or more monitored premises, such as premises 605a and 605b, that are associated with users of the monitoring entity 417. In some instances, there may be no overlap between monitored premises such as between premises 604a and 604b. This may be due to a user adjusting the range of coverage of a cellular interceptor corresponding to the premises 605a by reducing a signal strength of an LTE antenna associated with the cellular interceptor and reducing the area for monitoring zone A such that there is no longer any overlap with monitored zone B. Alternatively, or in another embodiment, selection of a low gain (such as below 5 dB) cellular interceptor antenna may limit the range of coverage to a specific zone such as zone A. In some other instances, adjusting a combination of transmission power values, antenna gain values and antenna location may provide control over a range of coverage of the cellular interceptor antenna. Additionally, known beam-forming techniques used in conjunction with the adjustable factors of the transmission power values, the antenna gain values and the antenna location may allow for control over the range of coverage of the cellular interceptor antenna. In some examples, the monitored premises 605a may be located in proximity to an unmonitored premises 605c, wherein no individuals are registered users of the monitoring entity 417, such that the range of coverage of a communication device 119 or cellular antenna integrated with a user device (e.g., set top box, security console, monitoring console, monitoring system, etc.) associated with the zone A 604a, overlaps with a portion of the unmonitored premises 605c. In this situation, it may be necessary to allow a user and/or associated user device, associated with the zone 1, to configure the settings of the monitoring entity 417 so as to prevent any unregistered device that may be detected within the overlapping area 606 from triggering an intruder alert notification and/or an alarm event. The unregistered devices detected regularly within the overlapping portion 606 may be factored out over time and assigned a non-threat score or a very low threat score (e.g., less than 2) and/or associated with a neighbor and assigned an authorization level. For example, the monitoring entity 417 may be capable of a learning process wherein if an unregistered device has been detected before (e.g., during nights, weekends, holiday seasons, etc.) and no sensors were tripped previously, the monitoring entity 417 may assign the unregistered device a non-threat score of 0.

Figure 7:
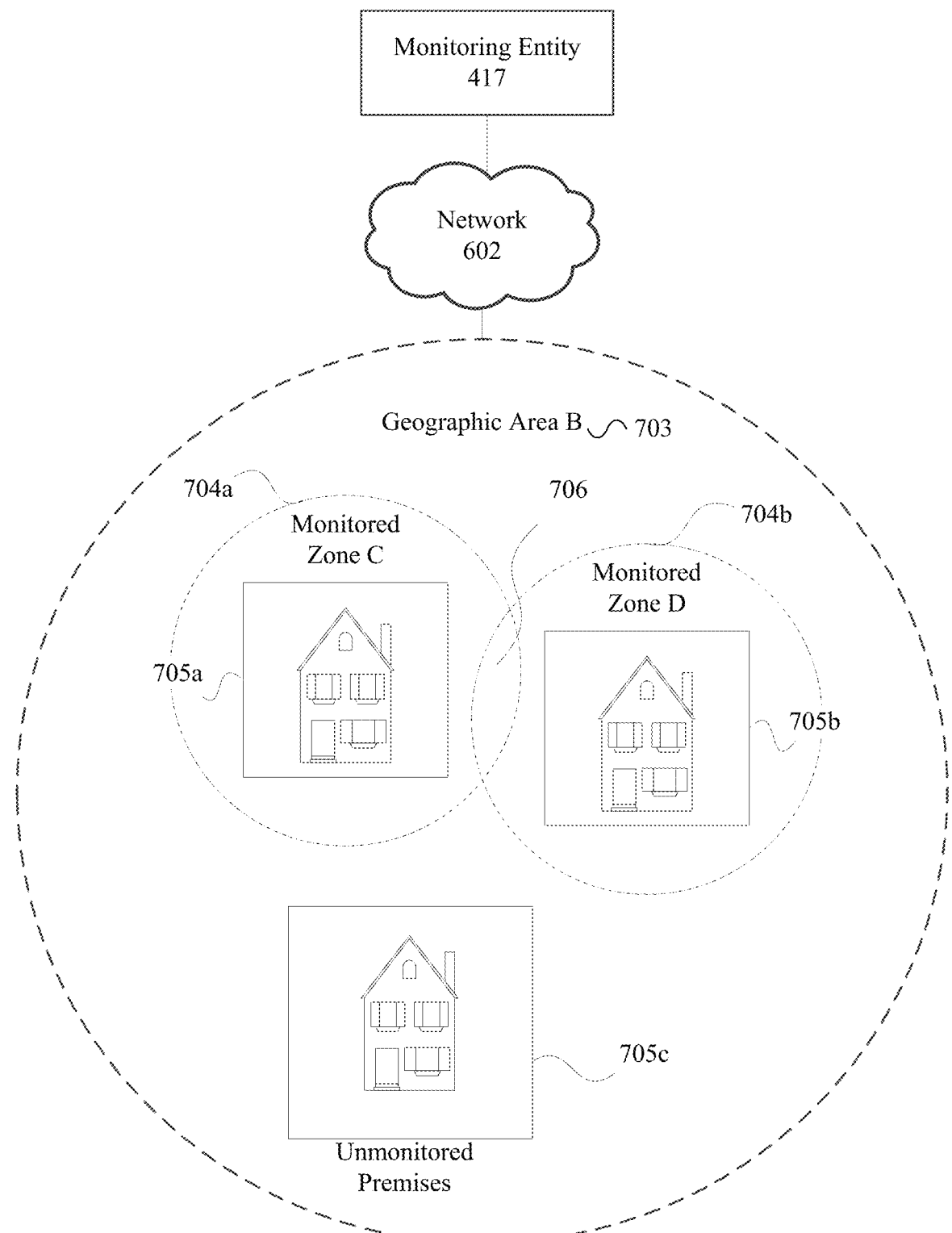
FIG. 7 shows an example operating environment in accordance with one or more aspects described herein.

FIG. 7 shows monitoring entity 417 (which may be similar to, and/or correspond to the monitoring system 305 or 505 in FIGS. 3-5) comprising one or more monitored zones, such as zone C 704a and zone D 704b, associated with one or more monitored premises, such as premises 705a and 705b. The monitored premises 705a may be located in close proximity to the monitored premises 705b such that the range of coverage of a communication device 119 associated with zone C 704a may overlap with the range of coverage of a communication device 119 associated with the monitored premises 705b in an overlapping region 706. In this situation, it may be necessary to allow a user and/or associated user device, associated with zone C, to configure the settings of the monitoring entity 417 so as to prevent any unregistered device that may be detected within the overlapping area 706 from triggering an intruder alert notification and/or an alarm event. This may be achieved by the monitoring entity 417 by factoring out regularly detected unregistered devices within the overlapping area 706 over time. For example, if an unregistered device is detected more than 5 times in a single day, with no alarm being triggered, the monitoring entity 417 may register the unregistered device as a low-threat device.

The unregistered device detected within the overlapping portion may be assigned a non-threat score and/or associated with a neighbor. For example, if the unregistered device is detected for prolonged periods of time during weekends, the monitoring entity 417 may assign the unregistered device a non-threat score and store non-threat information, the identification values for the unregistered device and detection time-frames into a local and/or remote database. In some instances, the monitoring entity 417 could take into account the days of the week, and may determine, for example, that if an unregistered device is detected to be present in a home for more than 10 hours over the course of one weekend, without triggering an alarm, then the monitoring entity 417 may register the device as a low-threat device.

Figure 8:
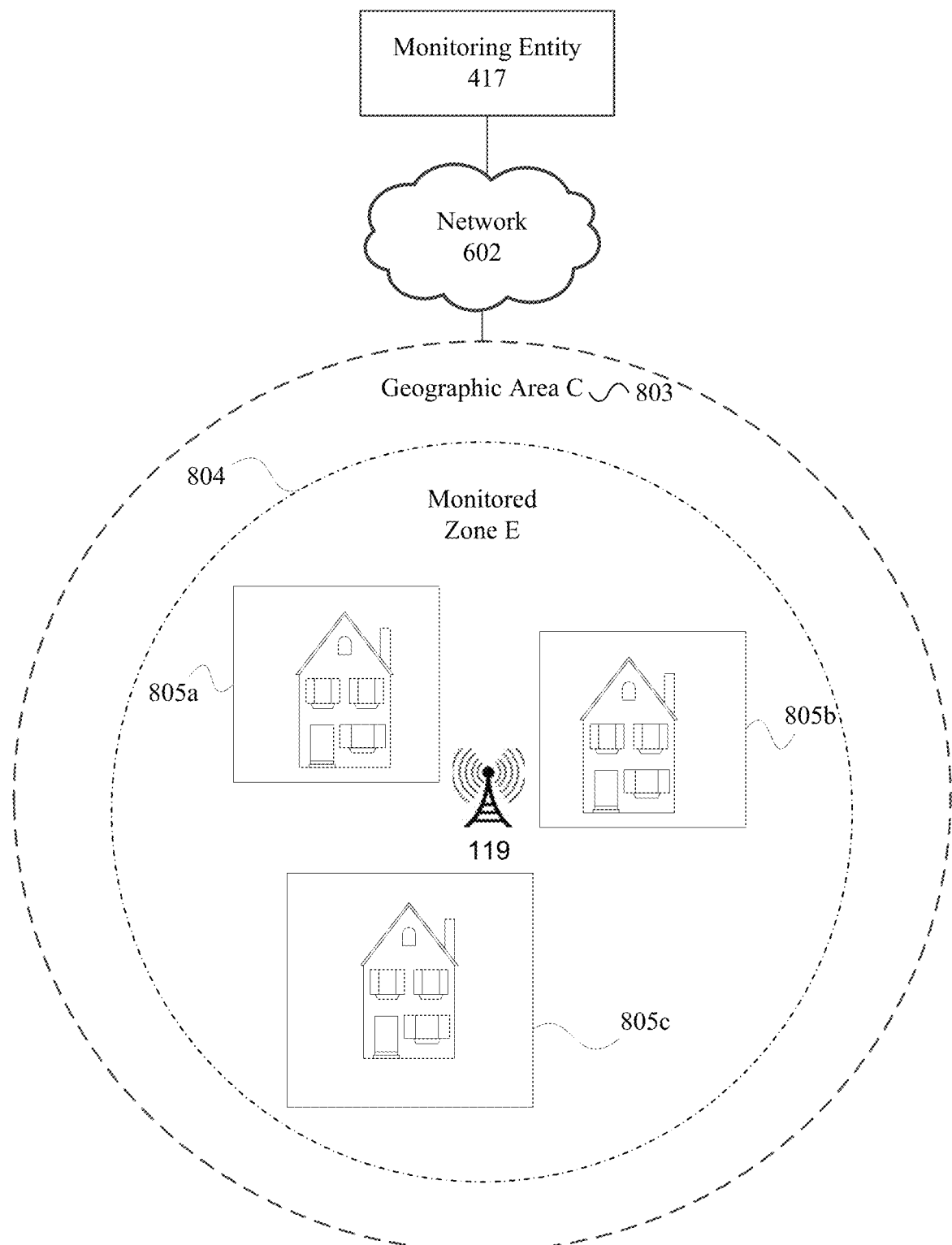
FIG. 8 shows an example operating environment in accordance with one or more aspects described herein.

FIG. 8 shows that monitoring entity 417 (which may be similar to, and/or correspond to the monitoring system 305, or 505 in FIGS. 3-5) may be configured to monitor multiple premises 805a, 805b and 805c (each of which may correspond to the premises 300 in FIG. 3) located within a geographic area C and designated to a monitored zone E. That is, one or more communication device 119, such as a cellular interceptor, may allow the monitoring entity 417 to detect cellular devices or other wireless devices within a range of coverage. For example, the range of coverage may be the monitored zone E 804. The monitoring entity 417 may be configured to allow a registered user device associated with one of the multiple premises to view status information, video, security settings, etc. for the corresponding premises and/or all of the monitored premises 805a, 805b and 805c.

The monitoring entity 417 may be configured to determine the location and/or identity of the users of the monitoring system 505 or other individuals in the monitored zone E 804 to carry out the examples discussed herein. The monitoring entity 417 may employ several known techniques for doing so. For example, the monitoring entity 417 may determine the identity and the location of each user present within the monitored zone E 804 via establishing communication links with each wireless registered user device through the communication devices 119. The monitoring entity may also determine the location of each user in the monitoring system 505 that may or might not be present within the monitored zone E 804, based on GPS location of each member's cellular devices, using Bluetooth or WiFi-based location, or other known methodologies. The monitoring entity 417 may also verify the identity of each user present within the monitored zone E using several known person recognition techniques, including for example, known key code, voice recognition, facial or pattern recognition, Bluetooth tags, and body-mass recognition, fingerprint recognition, retina scanner recognition, based on data collected from cameras, microphones, infrared sensors, biometric sensors, and/or any other desired sensors (e.g., using a cell phone/tablet microphone, camera, fingerprint scanner).

After an unregistered cellular device is detected as having crossed a perimeter associated with zone E 804, the monitoring entity 417 may detect and provide the identification information for the unregistered cellular device, such as the IMSI, IMEI and/or TMSI value, to one or more users (e.g., via an associated device) and/or security professionals, (e.g., via an associated devices), and/or may transmit an intruder alert notification as described below. According to some aspects, the monitoring entity 417 may provide information associated with a location of the unregistered cellular device to the one or more users to help them better understand the scenario that triggered the intruder alert. The monitoring entity 417 may send notifications that inform the one or more users about how much time it may take for emergency responders, police, etc. to arrive at the premises. For example, the monitoring entity 417 may be configured to receive user inputs corresponding to the intruder alert that clears the alert and/or adds the unregistered cellular device to a list of approved devices that have permission to access the monitored zone E 804 and a specific premises within the monitored zone E 804 such as the premises 805a or 805b or 805c. A predefined user configurable response application may be able to use such information regarding the identification information and the location information for the cellular device to determine a threat score to be associated with the intruder alert and whether authorities should be notified and dispatched.

The monitoring entity 417 may be configured to receive and store biometric identification for a user of the cellular device that may be used to clear or de-activate an intruder alert warning. The monitoring entity 417 may be configured to receive a confidential passphrase and/or other biometric identification associated with a user, to clear the intruder alert notification and/or to verify that the user might not be under duress to clear the intruder alert notification.

Figure 9B:
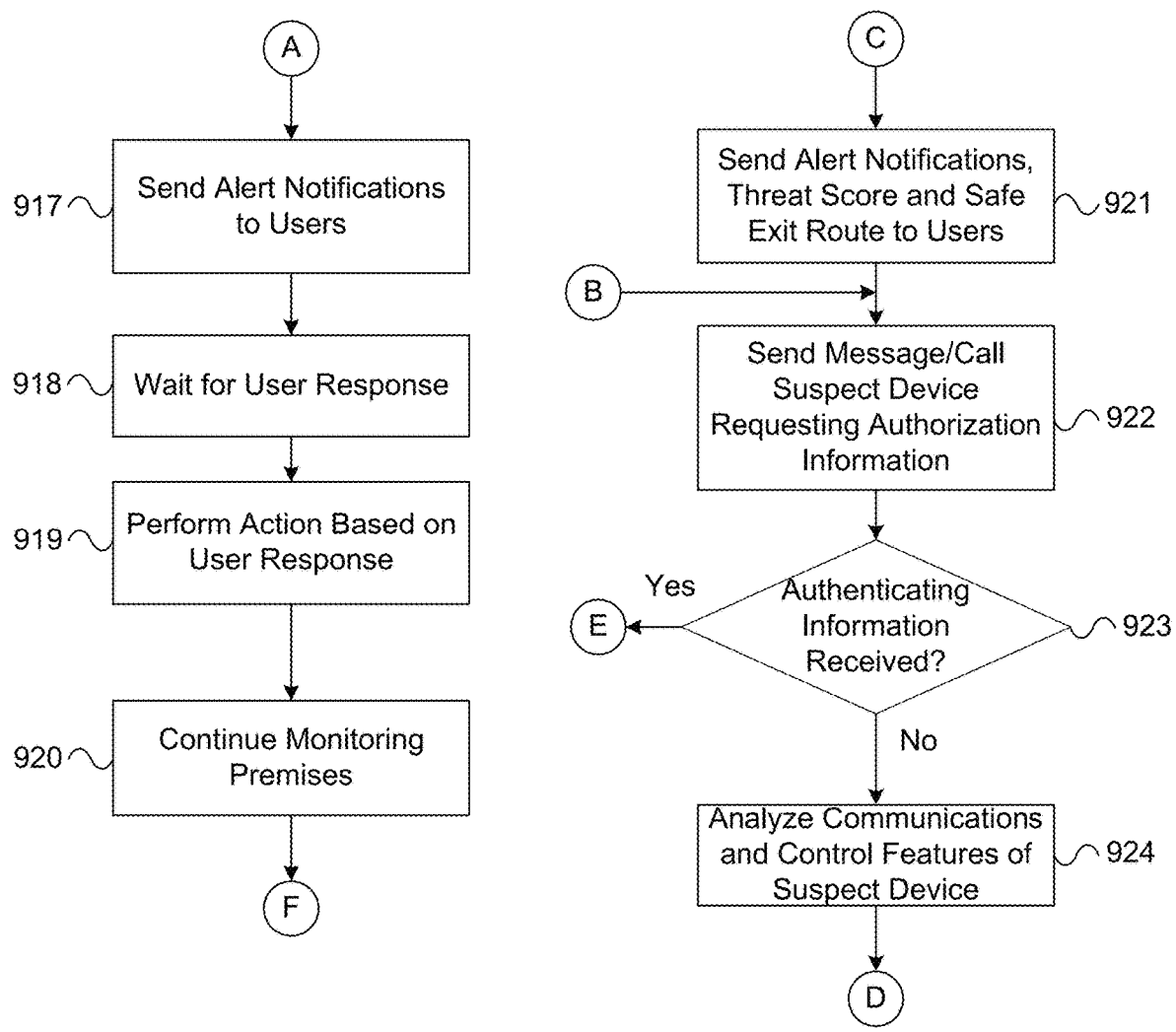
Figure 9C:
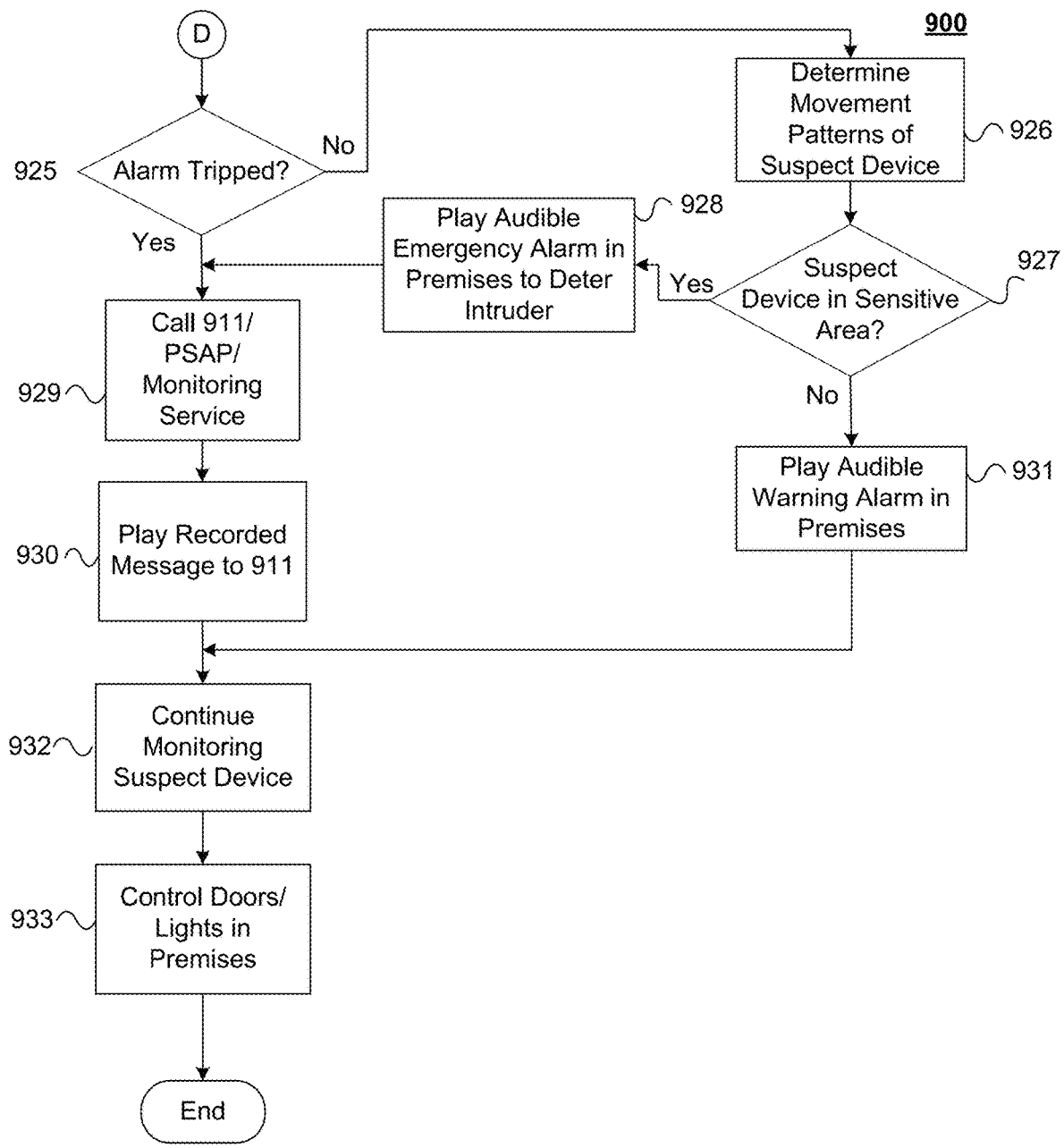

FIGS. 9A-9C show an exemplary flow diagram 900 for implementing embodiments contained herein. In one or more examples, the steps illustrated in FIG. 9 and/or one or more additional or alternative steps may be performed by one or more components and/or monitoring systems (e.g., by another monitoring system that is also located at the same premises, in a situation where two or more monitoring systems are present at the premises) shown in FIGS. 1-8. For example, the method may be performed by a home monitoring system located at a particular premises (e.g., the monitoring system 305 at the premises 300), or by one or more servers that are communicatively coupled to the monitoring system 305 and are located remotely from the premises 300 (e.g., at the local office 103). The steps in this flow diagram 900 need not all be performed in the order specified and some steps may be combined or might not be performed at all, and/or changed.

In step 901, when powered on, the particular computing device that may be performing the method illustrated in FIG. 9 may first execute a number of configuration steps. For example, the monitoring system 305 may load a number of different variables and settings (such as listed in Table A, Table B and Table C above) and/or may access a profile, which may be associated with one or more devices and/or users. Examples of the types of variables and settings that may be loaded include user preferences (e.g., regarding security codes for the monitoring system, types of audible alarms, layout of the premises, configuration of alarms based on dividing the premises 300 into predefined zones that correspond to different threat scores, a predefined time duration for waiting once a suspect device has been identified, etc.), networking information (e.g., network addresses for sensors installed at the premises 300, 400 or 500, network addresses for one or more monitoring server(s) that monitor the premises, etc.), and user profile information (e.g., identifiers associated with previously registered user devices, various information about different people who reside at the premises, including their names, ages, health conditions, special needs, etc.). In some instances, a registered user may provide a list of individuals that may be contacted during a threat situation. Predefined movement patterns and/or customizable movement patterns that may be indicative of an identity of a delivery man, cable provider, etc. may be stored in a memory of the monitoring system 305 and/or a database. The database may be stored locally at the monitoring system 505 or remotely in any one of the networked components of the monitoring system 505 such as the monitoring entity 417, the local office 103 and/or the web portal 418. The monitoring system 505 may be configured to verify that the triggering event was triggered by the child (e.g., a smaller person) via an analysis of the video camera 310 and/or motion detector 340 data feed data.

In step 902, the monitoring system 305 may initialize one or more communication links. This initialization may, for instance, including establishing electronic connections (e.g., via one or more networks, such as distribution network 100) with one or more sensors (e.g., the sensors 315, 320, 325 and 330) installed at the premises (e.g., the premises 300, 400 or 500), one or more monitoring entities (e.g., the monitoring entity 417, etc.) and other networked servers and devices (e.g., the doors 535 and 540) with which the computing device may exchange data (e.g., a server operated by a local PSAP).

In step 903, the computing device (e.g., the monitoring system, the application server, etc.) may register one or more cellular devices. This registration may, for instance, enable the monitoring system 305 to recognize the registered device(s) as belonging to a particular person who resides and/or works at the premises 300 where the monitoring system 305 may be installed, and this registration may be initiated and/or completed on one of the cellular devices being registered (e.g., by a user of such a cellular device). In some instances, the one or more cellular devices registered in step 903 may be cellular devices that have not been previously registered with the monitoring system, while in other instances, the monitoring system 305 may re-register previously registered cellular devices each time that the monitoring system 305 is powered on and/or initialized.

The monitoring system 305 may request a user of a registered cellular device for permission to access one or more social networking profiles of the user so that when and/or after an intruder has been detected and/or an alarm has been tripped, the user may allow the monitoring system 305 to share information (e.g. the information associated with the identity and/or the location of the intruder referred to in FIG. 5, the information associated with a type of the emergency, etc.) with one or more contacts from the social networking profile. In this way, if the user happens to be unavailable when a break-in is occurring, one of the user's friends may be able to take action to respond to the intruder alert. The monitoring system 305 may not need permission from a user to access one or more social networking profiles of the user. In such cases, when and/or after an intruder has been detected and/or an alarm has been tripped, the monitoring system 305 share information (e.g. information associated with an identity and/or location of the intruder, information associated with a type of the emergency, etc.) with one or more contacts from the one or more social networking profiles.

In registering with one or more cellular devices, the monitoring system 305 may request, receive, and store identification information (e.g. MAC addresses, IMEI values, IMSI values, etc.) that can be used to identify the one or more cellular devices, as well as user profile and associated user device information that can be used to provide more customized experiences to the users of the monitoring system. For example, the user profile information that may be requested, received, and stored by the monitoring system 305 may include the name(s), age(s), gender(s), language preference(s), health condition(s), special need(s), family relationship(s) (e.g., the identities of the user's mother, father, sibling(s), spouse, etc.), and/or other information for each person who may use each of the cellular devices being registered. In some instances, a particular cellular device may be used by more than one user (e.g., two children may share a single tablet computer, two users may be associated with the premises 300, etc.). In these instances, the user profile information may be requested, received, and stored for each user of the cellular device during registration, as this information may later be used by the monitoring system 305 in processing alarm signals (e.g., if the user profile information indicates that a certain cellular device has multiple users, when and/or after an intruder has been detected and/or an alarm has been tripped, the monitoring system 305 may prompt the user(s) to identify which user(s) are with or in proximity the device, so as to, for example, enable one or more aspects of the location-based alarm processing discussed herein).

At step 904, the monitoring system 305 may update a locally stored database and/or remotely stored database with information pertaining to the registered devices of step 903 and/or other wireless devices that have been previously detected. In some instances, if the suspect device has been assigned an authorization level that grants permission to access the premises, access permissions for the premises 300 or flagged by the user as a recognized device, the monitoring system 305 may update the database with information of the suspect device provided by the user, conclude that there is no threat situation present and no alarms may be triggered.

At step 905, the monitoring system 305 may detect cellular signals from a suspect device that has entered a range of coverage associated with the communication devices 119 (via the cellular interceptor, the LTE antenna, etc.). In some aspects, the monitoring system 305 may enter a monitoring loop and periodically check for any suspect device (e.g. cellular phones, laptops, wearable devices, etc.) present within the range of coverage of the communication devices 119.

In step 906, the monitoring system 305 may determine whether the suspect device has crossed the secure perimeter associated with the premises 300 based on a strength of the cellular signals received from the suspect device. In some instances, the monitoring system 305 may estimate a location of the suspect device based on known signal strength triangulation techniques and determine that the suspect device has crossed the secure perimeter. If the monitoring system 305 determines that the suspect device has crossed the secure perimeter, Yes at step 906, the monitoring system 305 may proceed to step 907. If the monitoring system 305 determines that the suspect device has not crossed the secure perimeter, No at step 906, the monitoring system 305 may proceed to step 905 and continue to monitor the area of coverage for the presence of wireless devices and/or cellular signals.

In step 907, the monitoring system 305 may acquire identification information associated with the suspect device, Yes at step 907. The monitoring system 305 may acquire the identification information from the suspect device via establishment of a communication link with the suspect device. The communication link with the suspect device may be established via the communication devices 119 located within or near the premises. The communication link may be based on GSM, CDMA and/or other cellular communication protocols. In some aspects, the monitoring system 305 may acquire unique identification values associated with the suspect device (e.g., the IMSI value, the TMSI value, the IMEI value, etc.) via the cellular communication protocols. If the monitoring system 305 is not able to establish the communication link with the suspect device, the monitoring system 305 may not be able to acquire the identification information associated with the suspect device. (No at step 907). The monitoring system 305 may proceed to step 917 of the flow 900.

In step 908, the monitoring system 305 may determine whether the suspect device is registered with the monitoring system 305 by comparing the acquired identification values for the suspect device with the stored information in the database of step 904. For example, the monitoring system 305 may compare the acquired identification values with stored IMSI values for registered cellular devices from the database.

In step 909, if the monitoring system 305 determines that there is a match between the acquired identification values for the suspect device and stored identification information for a registered device, the monitoring system 305 may continue to monitor cellular signals detected within the range of coverage of the communication devices 119, at step 905. If the monitoring system 305 detects a registered cellular device, the monitoring system 305 may perform various actions, such as opening a front gate, opening a garage, opening a front door and/or de-activating a front door alarm sensor, turning on lights near the entry points of the premises 300, etc. If the monitoring system 305 determines that the acquired identification values associated with the suspect device do not match any stored identification values in the database (No at step 909), the monitoring system 305 may determine that the suspect device is an unauthorized device and/or an unrecognized device and may proceed to step 910. The monitoring system 305 may utilize the communication devices 119 in order to provide community policing. For example, in situations of amber alerts, the communication devices 119 may compare acquired identification numbers for a suspect device with a database storing information related to cellular devices of persons of interest in the amber alerts. If there is a match between the acquired identification values for the suspect device and stored identification information for a device associated with an amber alert or other public broadcast, the monitoring system 305 may contact relevant authorities such as police or other emergency personnel.

In step 910, the monitoring system 305 may wait for a predetermined duration of time to help minimize false alarms from passersby. For example, if a stranger is passing by the premises 300, the monitoring system 305 may detect a cellular device, belonging to the stranger, and determine that the cellular device is an unregistered suspect device. The monitoring system 305 may proceed to wait for five minutes. During the wait period, the monitoring system 305 may communicate with sensors, detectors, cameras, user devices, etc. at the premises 300 to confirm that no sensors or alarms have been triggered. The predetermined duration of time for the wait period prevents the triggering of false alarms and/or false alert notifications associated with unregistered devices passing by the premises 300. In some instances, if the monitoring system 305 determines that sensors and/or alarms have been triggered during the wait period, the monitoring system may determine one or more response actions based on a conventional home security alarm system. For example, the monitoring system 305 may send alarm information and information associated with the suspect device to one or more users and/or security professionals, close doors, turn on/off lights, activate additional detectors, etc. in the premises 300. In another aspect, if the monitoring system 305 determines that one or more sensors 315 have been tripped, the monitoring system 305 will determine zone information associated with the one or more sensors 315 and may estimate a current location of the suspect device based on which sensor of the one or more sensors 315 was tripped and/or based on known signal strength triangulation techniques. For example, if a sensor has been tripped in zone 1, the monitoring system 305 may associate the zone 1 with a current location of an intruder. In other instances, if the monitoring system 305 determines that no sensors and/or alarms have been triggered during the wait period, the monitoring system may proceed to step 911.

At step 911, the monitoring system 305 may determine a current location for the suspect device based on analyzing cellular signal strengths received from the suspect device and/or other known signal strength triangulation techniques. In some instances, the monitoring system 305, may determine a movement pattern for the suspect device based on changes in the current location of the suspect device. The monitoring system 305 may compare the movement pattern of the suspect device with the stored predefined movement patterns of step 901. The monitoring system 305 may determine that the movement pattern associated with the suspect device matches that of the stored predefined movement pattern for the delivery man (e.g., UPS delivery, FedEx delivery, etc.). For example, the monitoring system 305 may determine that the suspect device is moving towards the entry way 510 or some other area associated with the premises 300 (e.g., a mailbox or front door associated with zone 1 355 of premises 300 in FIG. 3) and/or no sensors (e.g. the sensors 315, 320, 325 and 300 in FIG. 3) have been tripped. If the monitoring system 305 determines that the current location of the suspect device is within the perimeter associated with the premises 300, Yes at step 911, the monitoring system 305 may proceed to step 912. In some aspects, if the monitoring system 305 fails to detect any cellular signals from the suspect device, the monitoring system 305 may conclude that the suspect device has left the premises 300 (No at step 911). In some other aspects, if the monitoring system 305 determines that the current location of the suspect device is outside of the perimeter associated with the premises 300, No at step 911, the monitoring system 305 may proceed to step 904 and update the database with identification information associated with the suspect device and/or update an entry in the database associated with a time duration during which the suspect device was present within the perimeter associated with the premises 300.

In step 912, the monitoring system 305 may send alert notifications to registered user devices. In some situations, the alert notifications may include the movement pattern information determined for the suspect device from step 911 and/or the access permissions for a delivery man (e.g., grant permission to access the mailbox or the front door of the premises 300) that the monitoring system 305 may have assigned to the suspect device. In some aspects, the alert notifications may comprise the phone number for the suspect device, a time at which the suspect device was first detected, a time duration during which the suspect device has been present within the perimeter of the premises 300, etc. Other examples may include the acquired identification values associated with the suspect device, an image and/or video feed from one or more video cameras monitoring the premises 300 sent to the user via the alert notifications. In other instances, the monitoring system 305 may hack the suspect device and turn On video cameras and/or microphones of the suspect device. The video cameras and/or the microphones that have been turned On may provide additional avenues for acquiring data from the suspect device. For example, by turning On the microphones, the monitoring system 305 may be able to listen-in on the surroundings of the suspect device, pick up conversations and/or other sounds in the vicinity of the suspect device. As another example, by turning On the video camera, a stealth camera mode may be launched wherein all data captured by the video camera is sent to the monitoring system 305 without alerting the owner of the suspect device. This additional data may also be included in alert notifications sent to the registered user devices.

In step 913, the monitoring system 305 may wait for a user response. The wait duration may be based on determining a time of day. For example, if the time is 2 am, the monitoring system 305 may wait for 4 minutes. If the time of day is 3 pm, the monitoring system 305 may wait for 10 minutes. In some instances, if another alarm is tripped, the wait duration may be exited and the monitoring system 305 may proceed to step 917. In some other instances, the user response may confirm the access permissions assigned to the suspect device in step 912 and/or the user may be allowed to make changes associated with the access permissions assigned to the suspect device. In some other instances, the user response may clear the alert notification. For example, a user may recognize a phone number associated with the suspect device or recognize the intruder from the image and/or video feed and clear the suspect device for access to the premises 300. In some other instances, the user response may not recognize the phone number or other identification information associated with the suspect device and/or may not recognize the intruder from the image and/or video feed. The user may indicate a threat situation, trigger alarms, send alert information to other users or social media contacts, cause the monitoring system 305 to lock doors, turn on lights, etc.

In step 914, the monitoring system 305 may analyze the user response and determine one or more response actions. If the monitoring system 305 receives user instructions to clear the suspect device for access to the premises 300 (Yes at step 914), the monitoring system 305 may proceed to update the database with access information for the suspect device (at step 904). If the monitoring system 305 does not receive user instructions to clear the suspect device for access to the premises 300 (No at step 914), the monitoring system 305 may proceed to step 915.

In step 915, the monitoring system 305 may determine whether users are present within or near the premises 300. The monitoring system 305 may poll registered user devices for determining location information associated with the users. This polling may, for instance, include sending a request for current or updated location information to the registered user devices, and further may include receiving location information from the registered user devices in response to such a request. In some instances, the location information received from a registered cellular device may include the geographic coordinates of a single point that represents the cellular device's current position. If the monitoring system 305 determines that no users are present within or near the premises 300 (No at step 916), the monitoring system 305 may proceed to step 922 of the flow 900. If the monitoring system 305 determines that users are present within or near the premises 300 (Yes at step 916), the monitoring system 305 may proceed to step 916 of the flow 900.

In step 916, the monitoring system 305 may determine a location of a user within or near the premises 300 via analyzing wireless signal strengths between a device of the user and the communication devices 119 (such as a Wi-Fi modem, a Bluetooth device, an LTE antenna, etc.) and/or legitimate cellular base stations based on known signal strength triangulation techniques. In other instances, such location information may additionally or alternatively include a set of geographic coordinates, as well as corresponding timestamp information, that together model a recent trajectory or motion pattern of the user in the premises 300.

At step 917, the monitoring system 305 may transmit an intruder alert notification to registered user devices. According to some aspects, the monitoring system 305 may provide information indicative of a presence of the suspect device within the range of coverage of the cellular interceptor and that the cellular interceptor has failed to acquire unique identification values of the suspect device at step 907.

At step 918, the monitoring system 305 may wait for a predefined time duration for a user response. The predefined time duration may be based on determining a time of day associated with the alert notifications of step 917. For example, if the alert notifications were transmitted at midnight, the monitoring system 305 may shorten a time window for receiving the user response from 10 minutes to 5 minutes. In other instances, if one or more additional sensors are triggered and/or the cumulative threat score exceeds a predetermined value, the monitoring system 305 may exit the wait duration and proceed to step 929 of FIG. 9C.

At step 919, the monitoring system 305 may perform various actions based on the received user response. For example, the monitoring system 305 may raise security settings for the monitoring system 305 to the highest level and/or return to step 905 of FIG. 9A. In some other instances, the monitoring system 305 may function as a traditional security system.

At step 920, the monitoring system 305 may continue to monitor the premises 300 and proceed to step 905 of FIG. 9A to repeat the process flow. The monitoring system 305 may monitor sensors, alarms, detectors, door locks, etc. associated with the premises 300.

At step 921, the monitoring system 305 may evaluate the location information of the users present in the premises 300 and the location of the suspect device (from step 911) to determine a safe escape route (e.g., route 530) for people (e.g., residents, workers, other people, etc.) within or near the premises 300 based on a layout of the premises 300, activate and/or deactivate one or more sensors within or near the premises 300. In some instances, the response data may comprise a display of safe escape routes that are generated by an artificial intelligence system communicatively coupled with the monitoring system. The monitoring system 305 may assign the suspect device a threat score (for example, as listed in Table B). The monitoring system 305 may send alert notifications, the threat score and calculated safe exit routes to the users present within and/or near the premises 300.

At step 922, the monitoring system 305 may send a message to the suspect device requesting authenticating information such as a security code. The security code may be configured to grant the unregistered device access to the premises. In some instances, the monitoring system 305 may send one or more warning messages to the unregistered device. The one or more warning messages may indicate that the device has no access permissions for entering the premises 300 without providing the requested authenticating information. The monitoring system 305 may send the one or more warning messages via GSM or CDMA wireless protocols by establishing a communication link with the suspect device and the cellular interceptor using the phone number of the suspect device (as may be acquired in step 907 FIG. 9A). In some instances, the one or more warning messages intended for an intruder may cause the suspect device to play an audible warning message, display a text message and/or place a call to the suspect device. The one or more warning messages may be configured to emulate wireless emergency alerts in some instances. Additional audio and/or video messaging may be sent by the monitoring system 305 and via a common alerting protocol to the suspect device. The one or more warning messages may be configured to deter the intruder from attempting a break-in, burglary, etc. The monitoring system 305 may send one or more alert messages to registered users of the monitoring system 305 indicative of a pre-alarm event and/or presence of an intruder. The monitoring system 305 may send multiple warning messages to the unauthorized cellular device at predefined time intervals.

At step 923, the monitoring system 305 may determine whether the requested authenticating information has been received. If the monitoring system 305 determines that the authenticating information has not been received, No at step 923, (e.g., if an incorrect security code is received from the suspect device, no security code is received from the suspect device within a predefined time interval, such as listed in Table B), the monitoring system 305 may proceed to step 924. In some instances, the monitoring system 305 may send a notification associated with the suspect device and/or the incorrect security code to the registered user devices. The notification may comprise information associated with the suspect device. For example, this information may include the acquired identification values associated with the unauthorized cellular device (e.g., the phone number), an image and/or video feed from one or more video cameras monitoring the premises 300 and/or criminal records associated with the unauthorized cellular device (or phone number) that may cause pre-configured alert information to be sent via notifications to the user devices. For example, phone numbers associated with stalkers may be stored in a database along with a pre-defined alert message comprising photo identification of the stalkers and any other criminal records of the stalkers that may provide immediate alert notifications. In some instances, the user may recognize the intruder via the image or video feed and may want to grant the unauthorized cellular device authorization to enter the premises 300. For example, if a user of the monitoring system 305 recognizes guests that have arrived at the premises 300, the user may grant authorization to the guests (and associated devices) to enter the premises 300 by providing them the security code. In another example, a user of the monitoring system 305 may want to grant certain guests permission to enter certain areas of the premises. In this situation, different security codes could be utilized to grant devices associated with guests different authorization levels so that some guests may have permission to access the entire premises 300 while a portion of the guests may have permission to access certain zones of the premises 300 (e.g., the zone 1 355, the zone 2 360, etc.) In some instances, the monitoring system 305 may designate a first security code for granting access permissions to a first floor of the premises. The monitoring system 305 may also designate a second security code for granting access permissions to a second floor and a tenth floor of the premises. The different security codes associated with different authorization levels could be assigned different expiry times or expiration credentials. If the monitoring system 305 determines that the authenticating information has been received (Yes at step 923), the monitoring system 305 may proceed to step 904. For example, if the monitoring system 305 receives a correct security code from the suspect device and/or no sensors are tripped, the monitoring system 305 may purge any other information, different from the acquired unique identification values, associated with the suspect device.

At step 924, the monitoring system 305 may intercept data transmissions (e.g., voice calls, text messages, emails, voice messages, etc.) sent and/or received from the suspect device via the communication device 119 and analyze the intercepted data transmission to determine information associated with an intruder and one or more accomplices of the intruder. For example, the intruder may place one or more calls to additional cellular devices that may have been identified by the monitoring system 305 as suspect devices present within the premises 300. The additional cellular devices may be flagged as belonging to accomplices of the intruder while coordinating a break-in at the premises 300. In another example, the intruder may send and/or receive data, via the suspect device, pertaining to the premises 300, a robbery plan, surveillance information associated with the premises 300, etc. The monitoring system 305 may analyze the data sent and received by the suspect device, identify key words such as robbery, break-in, surveillance, etc. and increase the threat score determined at step 921 of FIG. 9B. The increased threat score and information associated with the additional suspect devices may be sent to users via one or more alert notifications. The monitoring system 305 may hack into the suspect device and gain control over one or more software applications and/or other features of the suspect device. For example, the monitoring system 305 may cause installation of spy software on the suspect device via Wi-Fi and/or cellular protocols. The installed spy software may turn on the video camera and/or microphone of the suspect device, listen-in on the surroundings of the suspect device and collect video camera feed from the suspect device. The spy software may further access data stored within the suspect device (such as stored images, profile photographs, fingerprints, audio recordings, text messages, social media profiles, etc.) and send the accessed data to the monitoring system 305. Using the identification values of the suspect device (as acquired in step 907 of FIG. 9A), and/or a public key used by cellular base stations for decrypting cellular communications, the monitoring system 305 may determine an encryption key for decrypting encrypted data stored in the suspect device. In some instances, the monitoring system 305 may gain control over a camera of the suspect device and remotely control the camera to capture images of the intruder. For example, if the monitoring system 305 places a call to the suspect device, and the intruder checks the suspect device in response to the call, the monitoring system 305 may control the camera to capture images of the intruder. The images of the intruder may be sent to users and or security professionals. The monitoring system 305 may remotely control a software application of the suspect device to produce an audible tone, turn on/off a flash light, or place a call to security professionals, etc. In some instances, the monitoring system 305 may send an alert notification associated with the suspect device and/or the incorrect security code to the registered user devices. For example, the alert notification may include the acquired identification values of the suspect device or an image and/or video feed from one or more video cameras monitoring the premises 300. In other instances, the monitoring system 305 may cause the suspect device to play an audible warning message (such as, "do not enter," "leave the premises 500," "your cellular has been hijacked", "emergency responders have been notified of your presence," "We have captured information from your phone, so get out!," etc.).

As another embodiment, in step 924, the monitoring system 305 may transmit one or more stored images from the suspect's device to a PSAP to help look-up criminal records, etc. Facial recognition techniques performed on the transmitted one or more images may identify a match with an image from a database of images stored in the PSAP and may provide identity information corresponding to the intruder. If the identity of the intruder is indicative of a prior criminal record, data associated with the intruder that is publicly accessible via the PSAP, may be acquired by the monitoring system 305 and may be forwarded to the user and/or other security professionals.

At step 925, the monitoring system 305 may determine whether an alarm has been tripped by checking the state of various sensors, detectors and alarms within the premises 300. In addition to checking the states of various sensors, the monitoring system 305 also may perform one or more other actions. For example, the monitoring system 305 may also send and/or receive messages to and/or from other devices that are located at the premises or at another location. For example, the monitoring system 305 may send and/or receive messages from one or more personal health sensors or wearable devices that monitor the health of users located within or near the premises 300. Monitoring the health of users located within or near the premises may allow the monitoring system 305 to make informed decisions associated with a threat situation and/or the estimation of a safe exit route. For example, if the one or more personal health sensors indicate a medical condition associated with an individual present within the premises during a threat situation, the monitoring system 305 may determine that the individual needs to use an elevator instead of stairs, even though the elevator may be located further away from a current location of the individual. The monitoring system 305 may transmit a modified safe exit route to the individual based on data received from the one or more personal health sensors. If the monitoring system 305 determines that an alarm or sensor has been tripped, Yes at step 925, the monitoring system 305 may proceed to step 929. If the monitoring system 305 determines that an alarm or sensor has not been tripped as yet, No at step 925, the monitoring system 305 may proceed to step 926.

At step 926, the monitoring system 305 may determine movement patterns of the suspect device. The movement patterns may be based on the location information for the suspect device and time stamp information indicative of a time associated with each location of the suspect device.

At step 927, the monitoring system 305 may analyze the movement patterns of the suspect to determine whether the suspect device has moved into a sensitive area of the premises 300 (such as an office, a bedroom, a kitchen, etc.). The sensitive area of the premises 300 may be determined at step 901 and set-up by one or more users of the monitoring system 305 based on a layout of the premises 300 and/or other customizable preferences. In some instances, the analysis of the movement patterns may predict a trajectory of the suspect device moving towards the sensitive area and away from an exit of the premises 300. If the monitoring system 305 concludes that the suspect device is in the sensitive area or is proceeding towards the sensitive area, the monitoring system 305 may proceed to step 928. If the monitoring system 305 concludes that the suspect device is not in the sensitive area or is not proceeding towards the sensitive area (e.g., moving towards an exit of the premises 300), the monitoring system 305 may proceed to step 931.

At step 928, the monitoring system 305 may cause an emergency audible alarm to be played in the premises 300 to notify users of the presence of the intruder. For example, the emergency alarm may be a loud, audible alarm played throughout the premises 300 to warn users of the presence of the intruder in a sensitive area of the premises and/or to deter the intruder from committing criminal acts. The audible alarm may be played via speakers, sirens, stereos, televisions, etc. present in the premises 300. In some instances, the emergency audible alarm may be customized to reflect which zone (the monitored zones A, B, C, D, E, etc.) the suspect device is located at. The monitoring system 305 may send alert notifications indicative of the zonal location information of the suspect device and/or movement patterns of the suspect device in the premises 300.

At step 929, the monitoring system 305 may call 911, a PSAP and/or other monitoring service. In some instances, the monitoring system 305 may call 911 to deliver information pertaining to the suspect device, the tripped alarm, etc.

At step 930, the monitoring system 305 may transmit a recorded voice message that provides details of the premises 300 (such as an address, a number of residents, the layout/floorplan, etc.) during the 911 call. In some instances, the voice message may provide details of the threat situation (such as the failure to receive the security code, the phone number of the suspect device, whether multiple suspect devices have been detected within the premises 300, location information of users and the intruder, etc.).

At step 931, the monitoring system 305 may play an audible warning alarm (such as "intruder in basement," "intruder in zone 2," "motion detector in zone 1 tripped," etc.) in the premises 300 that may be specific to the zone the suspect device is located at. The intruder may hear the audible alarm warning and take corrective actions, such as calling the user, leaving the premises 300, entering the correct security code, etc. If the intruder calls the user, the monitoring system 305 may receive a request from the suspect device indicative of establishing a cellular communication link with a registered user device via the cellular interceptor tower. The monitoring system 305 may pause the playing of the audible warning alarm and wait for a user response since the monitoring system 305 knows that the intruder is calling the user. The user response may grant the suspect device access privileges and/or clear any alarms that may be have triggered.

At step 932, the monitoring system 305 may compare the location information of users, the location information of the suspect device, time stamp information associated with the location information, and the state of various sensors at the premises 300 with a look-up table included in the response file. Based on this comparison, the monitoring system 305 may determine which set of circumstances in the look-up table most closely matches the actual circumstances (e.g., in terms of which sensor was tripped, a location of the tripped sensor, a time of day when the alarm was tripped, and where the registered user devices are), and subsequently may determine updated safe exit routes. An example of such a look-up table, which includes different sets of circumstances for estimating the updated safe exit routes, is illustrated in Table D below:

TABLE D

| Condition Set Number | Proximity of Unregistered Device to Zone 1 | Proximity of Unregistered Device to Zone 2 | Zone in which Sensor(s) Tripped | Time Since Sensor(s) Tripped | Zonal Location of User | Safe Exit Route Number |
|---|---|---|---|---|---|---|
| 1 | Within 200 yards | Within 400 yards | 1 | 15 seconds | 3 | 1 |
| 2 | Within 400 yards | Within 200 yards | — | — | 2 | 3 |
| 3 | Within 100 yards | Within 100 yards | 3 | 5 seconds | 4 | 2 |

In some instances, at step 932, a user may be provided with the location information of the suspect device and/or other users present within the premises 300. The location information may comprise time stamp information associated with movement patterns of the suspect device. In some instances, the monitoring system 305 may cause one or more registered user devices to provide a display of the real-time locations of the plurality of users and the intruder so that registered users and emergency personnel may be informed of which registered users are in greater danger.

In some other instances, at step 932, if the monitoring system 305 determines that the suspect device has left the premises, the monitoring system 305 may purge information associated with the suspect device. For example, the monitoring system 305 may purge the encryption key, decrypted data from unauthorized cellular device, information associated with the intruder, one or more accomplices, information indicating an identity of the intruder (e.g., stored images, profile photographs, fingerprints, audio recordings, text messages, etc.) from the database.

At step 933, the monitoring system 305 may transmit instructions to one or more video cameras installed in the premises 300 in order to record content associated with the intruder presence. The monitoring system 305 may also remotely secure additional locks and/or doors within the premises 300, unlock doors and/or windows within the premises 300 and/or turn on or off one or more lights within the premises 300 to help residents evacuate the premises 300 or deter the intruder from accessing certain locations within or near the premises as illustrated in FIG. 5 of the specification. The monitoring system 305 may also determine what type of alarm has been triggered. Different types of alarms may, for instance, include burglar alarms, fire alarms, medical alarms, and other types of alarms. The device's response to a particular alarm may depend on the type of alarm that has been triggered, as different types of alarms may call for different types of responses. The device's response to a particular alarm may depend on how long it may take authorities (e.g., police, emergency responders, etc.) to arrive at the premises. The monitoring system 305 may send information associated with a response time for authorities to respond to the alarm event or intruder alert sent to registered user devices and/or other user devices based on a predetermined contact tree. For example, the monitoring system 305 may determine that emergency responders may arrive at the premises 300 after 25 minutes since the triggering of the intruder alert and/or alarm at the premises.

At step 933, the monitoring system 305 may determine additional unregistered wireless devices (e.g., laptops, wearable devices, etc.) carried by (or otherwise associated, near, or in proximity to) the intruder via remotely accessing software applications on the unregistered cellular device that are in communication with the additional unregistered wireless devices via Wi-Fi, Bluetooth, etc. wireless protocols. In some other instances, the monitoring system 305 may determine the additional unregistered wireless devices via establishing Wi-Fi, Bluetooth, etc. communication links with the additional unregistered devices. The communication links established between the monitoring system 305 and the additional unregistered d devices may help determine MAC addresses for each of the additional unregistered devices. The monitoring system 305 may compare the acquired MAC addresses to stored MAC addresses for registered user devices. If the monitoring system 305 determines that there is no match between the acquired MAC addresses and the stored MAC addresses, the monitoring system 305 may eavesdrop and/or analyze communication data associated with the additional unregistered devices to identify key words (e.g., jewelry, robbery, etc.) that are indicative of criminal intentions.

At step 933, the monitoring system 305 may send the identification information associated with the intruder, the location information for the suspect device and the additional unregistered devices to registered user devices, emergency personnel, security professionals, PSAPs and/or or other social media contacts. In some instances, the monitoring system 305 may automatically transmit the information to emergency personnel, security professionals, PSAPs, etc. and in other instances, the monitoring system 305 may transmit the information after receiving permission to transmit the information to emergency personnel, security professionals, PSAPs, etc. from the registered user devices. In some instances, if an intruder associated with the suspect device leaves the premises 300, the monitoring system 305 and/or the users may send the identification values associated with the suspect device to security personnel to help the security personnel track the location of the suspect device. The location of the suspect device may be tracked via the IMEI value and cellular communications with legitimate cellular base stations.

In some instances, at step 933, the monitoring system 305 may further modify safe exit routes for the users present in or near the premises 300 by taking into account communications from security professionals and/or other emergency personnel and transmit the modified safe exit routes to the users. For example, in some instances, security professionals may be arriving at the premises 300 in 10 minutes at an entrance to the east of the premises. The security professionals may direct residents and/or other users present within the premises 300 to escape towards that entrance. In some instances, the monitoring system 305 may allow security professionals to communicate directly with an intruder (e.g., via the intruder's cellular device 520, a registered user device present near the intruder, etc.) and deter an intruder from carrying out a break-in and/or other dangerous acts. For example, the monitoring system 305 may remotely activate a speaker function of the suspect device and allow security professionals to deliver a message to the intruder via the speaker function. In another example, a pre-recorded audio message may be delivered to the intruder via the speaker function and by the monitoring system 305 and/or registered user devices. The monitoring system 305 may control one or more door locks to seal off a part of the premises 300 (as was described for FIG. 5). For example, if the monitoring system 305 detects one or more users are present in a basement of the premises 300, the monitoring system 305 may automatically secure door locks that lead to the basement. As another example, the monitoring system 305 may identify a room and/or area of the premises 300 that may be sealed off to trap an intruder. The monitoring system 305 may automatically operate the corresponding door locks to trap the intruder.

In some other instances, at step 933, the monitoring system 305 may send response data such as control instructions to one or more video cameras 310 to capture and transmit videos associated with the alarm events and to networked lights 350 within or near the premises 300 that may aid users in escaping safely, provide visual warnings, etc. The monitoring system 305 may send response data describing the alarm events to the users, neighbors and emergency personnel. In some instances, the response data may allow users to control the one or more video cameras 310, door locks, networked lights 350, etc. within or near the premises 300 and view various entry/exit points within or near the premises.

The descriptions above are merely example embodiments of various concepts. They may be rearranged/divided/combined as desired, and one or more components or steps may be added or removed without departing from the spirit of the features described herein. The scope of this patent should only be determined by the claims that follow.

The invention claimed is:

1. A method comprising:
   determining, by a monitoring device, that a first device is at a premises based on one or more wireless signals detected from the first device;
   determining information associated with the first device;
   determining, based on the information, that the first device is an unauthorized device at the premises; and
   based on the first device being an unauthorized device at the premises, sending, to the unauthorized device, at least one message.

2. The method of claim 1, wherein sending the at least one message to the unauthorized device comprises at least one of:
   sending, to the unauthorized device, a text message indicating unauthorized presence at the premises;
   placing a phone call to the unauthorized device;
   sending, to the unauthorized device, an audible message to be output by a speaker of the unauthorized device;
   sending, to the unauthorized device, a message that emulates a wireless emergency alert;
   placing a phone call to the unauthorized device and sending, to the unauthorized device after determining that the phone call is answered, an audio message; or
   sending, to the unauthorized device, a request for authentication information.

3. The method of claim 1, wherein the at least one message is sent to the unauthorized device a plurality of times and at predefined time intervals.

4. The method of claim 1, wherein the at least one message is configured to cause the unauthorized device to perform an action comprising at least one of:
installing, on the unauthorized device, spy software;
accessing data stored on the unauthorized device and sending, to one or more devices, the accessed data;
capturing, using a camera of the unauthorized device, an image or video and sending, to one or more devices, the captured image or video;
capturing, using a microphone of the unauthorized device, audio of surroundings of the unauthorized device and sending, to one or more devices, the captured audio;
causing output, using a software application installed on the unauthorized device, of an audible tone;
controlling a light of the unauthorized device to flash on and off;
placing a phone call to one or more devices; or
sending, to one or more devices, global positioning system (GPS) data associated with the unauthorized device.

5. The method of claim 1, wherein determining the information associated with the first device comprises at least one of:
determining identification information of the first device;
determining location information associated with the first device; or
determining movement patterns associated with the first device.

6. The method of claim 1, further comprising:
sending, to the unauthorized device and based on the information, a first access code for authorized access to a first zone of the premises.

7. The method of claim 6, further comprising:
monitoring, based on the information, a movement pattern of the unauthorized device to determine whether the unauthorized device is within a proximity of a second zone, of the premises, different from the first zone; and
based on determining that the unauthorized device is within the proximity of the second zone, causing a security response.

8. The method of claim 6, wherein the first access code permits the unauthorized device authorized access to the first zone for a time period, and
wherein the method further comprises monitoring, based on the information, location information of the unauthorized device to determine whether the unauthorized device is within a proximity of the first zone after an expiration of the time period.

9. The method of claim 1, further comprising:
after determining that the first device is an unauthorized device at the premises, monitoring, based on the information, location information of the unauthorized device;
determining, based on the location information, a zone, of the premises, in which the unauthorized device is located; and
determining, based on the determined zone and based on information that identifies, for each of a plurality of zones of the premises, a corresponding threat level, a security response associated with a threat level corresponding to the determined zone.

10. The method of claim 1, wherein the one or more wireless signals comprise at least one of: cellular signals, Bluetooth signals, ZigBee signals, Z-Wave signals, Thread signals, Wi-Fi signals, global system for mobile (GSM) communication signals, or code division multiple access (CDMA) signals.

11. A computing device comprising:
one or more processors; and
memory storing instructions that, when executed by the one or more processors, cause the computing device to:
determine that a first device is at a premises based on one or more wireless signals detected from the first device;
determine information associated with the first device;
determine, based on the information, that the first device is an unauthorized device at the premises; and
based on the first device being an unauthorized device at the premises, send, to the unauthorized device, at least one message.

12. The computing device of claim 11, wherein the instructions, when executed by the one or more processors, cause the computing device to send the at least one message to the unauthorized device by at least one of:
sending, to the unauthorized device, a text message indicating unauthorized presence at the premises;
placing a phone call to the unauthorized device;
sending, to the unauthorized device, an audible message to be output by a speaker of the unauthorized device;
sending, to the unauthorized device, a message that emulates a wireless emergency alert;
placing a phone call to the unauthorized device and sending, to the unauthorized device after determining that the phone call is answered, an audio message; or
sending, to the unauthorized device, a request for authentication information.

13. The computing device of claim 11, wherein the at least one message is sent to the unauthorized device a plurality of times and at predefined time intervals.

14. The computing device of claim 11, wherein the at least one message is configured to cause the unauthorized device to perform an action comprising at least one of:
installing, on the unauthorized device, spy software;
accessing data stored on the unauthorized device and sending, to one or more devices, the accessed data;
capturing, using a camera of the unauthorized device, an image or video and sending, to one or more devices, the captured image or video;
capturing, using a microphone of the unauthorized device, audio of surroundings of the unauthorized device and sending, to one or more devices, the captured audio;
causing output, using a software application installed on the unauthorized device, an audible tone;
controlling a light of the unauthorized device to flash on and off;
placing a phone call to one or more devices; or
sending, to one or more devices, GPS data associated with the unauthorized device.

15. The computing device of claim 11, wherein the instructions, when executed by the one or more processers, cause the computing device to determine the information associated with the first device by at least one of:
determining identification information of the first device;
determining location information associated with the first device; or
determining movement patterns associated with the first device.

16. The computing device of claim 11, wherein the instructions, when executed by the one or more processers, further cause the computing device to:
send, to the unauthorized device and based on the information, a first access code for authorized access to a first zone of the premises.

17. The computing device of claim 16, wherein the instructions, when executed by the one or more processors, further cause the computing device to:
   monitor, based on the information, a movement pattern of the unauthorized device to determine whether the unauthorized device is within a proximity of a second zone, of the premises, different from the first zone; and
   based on determining that the unauthorized device is within the proximity of the second zone, cause a security response.

18. The computing device of claim 16, wherein the first access code permits the unauthorized device authorized access to the first zone for a time period, and
   wherein the instructions, when executed by the one or more processors, further cause the computing device to:
      monitor, based on the information, location information of the unauthorized device to determine whether the unauthorized device is within a proximity of the first zone after an expiration of the time period.

19. The computing device of claim 11, wherein the instructions, when executed by the one or more processors, further cause the computing device to:
   after determining that the first device is an unauthorized device at the premises, monitor, based on the information, location information of the unauthorized device;
   determine, based on the location information, a zone, of the premises, in which the unauthorized device is located; and
   determine, based on the determined zone and based on information that identifies, for each of a plurality of zones of the premises, a corresponding threat level, a security response associated with a threat level corresponding to the determined zone.

20. The computing device of claim 11, wherein the one or more wireless signals comprise at least one of: cellular signals, Bluetooth signals, ZigBee signals, Z-Wave signals, Thread signals, Wi-Fi signals, global system for mobile (GSM) communication signals, or code division multiple access (CDMA) signals.

21. A non-transitory, computer-readable medium storing instructions that, when executed by a computing device, cause:
   determining that a first device is at a premises based on one or more wireless signals detected from the first device;
   determining information associated with the first device;
   determining, based on the information, that the first device is an unauthorized device at the premises; and
   based on the first device being an unauthorized device at the premises, sending, to the unauthorized device, at least one message.

22. The non-transitory, computer-readable medium of claim 21, wherein the instructions, when executed by the computing device, further cause sending the at least one message to the unauthorized device by at least one of:
   sending, to the unauthorized device, a text message indicating unauthorized presence at the premises;
   placing a phone call to the unauthorized device;
   sending, to the unauthorized device, an audible message to be output by a speaker of the unauthorized device;
   sending, to the unauthorized device, a message that emulates a wireless emergency alert;
   placing a phone call to the unauthorized device and sending, to the unauthorized device after determining that the phone call is answered, an audio message; or
   sending, to the unauthorized device, a request for authentication information.

23. The non-transitory, computer-readable medium of claim 21, wherein the at least one message is sent to the unauthorized device a plurality of times and at predefined time intervals.

24. The non-transitory, computer-readable medium of claim 21, wherein the at least one message is configured to cause the unauthorized device to perform an action comprising at least one of:
   installing, on the unauthorized device, spy software;
   accessing data stored on the unauthorized device and sending, to one or more devices, the accessed data;
   capturing, using a camera of the unauthorized device, an image or video and sending, to one or more devices, the captured image or video;
   capturing, using a microphone of the unauthorized device, audio of surroundings of the unauthorized device and sending, to one or more devices, the captured audio;
   causing output, using a software application installed on the unauthorized device, of an audible tone;
   controlling a light of the unauthorized device to flash on and off;
   placing a phone call to one or more devices; or
   sending, to one or more devices, global positioning system (GPS) data associated with the unauthorized device.

25. The non-transitory, computer-readable medium of claim 21, wherein the instructions, when executed by the computing device, further cause determining the information associated with the first device by at least one of:
   determining identification information of the first device;
   determining location information associated with the first device; or
   determining movement patterns associated with the first device.

26. The non-transitory, computer-readable medium of claim 21, wherein the instructions, when executed by the computing device, further cause:
   sending, to the unauthorized device and based on the information, a first access code for authorized access to a first zone of the premises.

27. The non-transitory, computer-readable medium of claim 26, wherein the instructions, when executed by the computing device, further cause:
   monitoring, based on the information, a movement pattern of the unauthorized device to determine whether the unauthorized device is within a proximity of a second zone, of the premises, different from the first zone; and
   based on determining that the unauthorized device is within the proximity of the second zone, causing a security response.

28. The non-transitory, computer-readable medium of claim 26, wherein the first access code permits the unauthorized device authorized access to the first zone for a time period, and
   wherein the instructions, when executed by the computing device, further cause:
      monitoring, based on the information, location information of the unauthorized device to determine whether the unauthorized device is within a proximity of the first zone after an expiration of the time period.

29. The non-transitory, computer-readable medium of claim 21, wherein the instructions, when executed by the computing device, further cause:
- after determining that the first device is an unauthorized device at the premises, monitoring, based on the information, location information of the unauthorized device;
- determining, based on the location information, a zone, of the premises, in which the unauthorized device is located; and
- determining, based on the determined zone and based on information that identifies, for each of a plurality of zones of the premises, a corresponding threat level, a security response associated with a threat level corresponding to the determined zone.

30. The non-transitory, computer-readable medium of claim 21, wherein the one or more wireless signals comprise at least one of: cellular signals, Bluetooth signals, ZigBee signals, Z-Wave signals, Thread signals, Wi-Fi signals, global system for mobile (GSM) communication signals, or code division multiple access (CDMA) signals.

31. A system comprising:
- a first device; and
- a computing device,
- wherein the first device is configured to send wireless signals, and
- wherein the computing device is configured to:
  - determine the first device is at a premises based on one or more wireless signals that detected from the first device;
  - determine information associated with the first device;
  - determine, based on the information, that the first device is an unauthorized device at the premises; and
  - based on the first device being an unauthorized device at the premises, send, to the unauthorized device and based on the information, at least one message.

32. The system of claim 31, wherein the computing device is configured to send the at least one message to the unauthorized device by at least one of:
- sending, to the unauthorized device, a text message indicating unauthorized presence at the premises;
- placing a phone call to the unauthorized device;
- sending, to the unauthorized device, an audible message to be output by a speaker of the unauthorized device;
- sending, to the unauthorized device, a message that emulates a wireless emergency alert;
- placing a phone call to the unauthorized device and sending, to the unauthorized device after determining that the phone call is answered, an audio message; or
- sending, to the unauthorized device, a request for authentication information.

33. The system of claim 31, wherein the computing device is configured to send the at least one message to the unauthorized device a plurality of times and at predefined time intervals.

34. The system of claim 31, wherein the at least one message is configured to cause the unauthorized device to perform an action comprising at least one of:
- installing, on the unauthorized device, spy software;
- accessing data stored on the unauthorized device and sending, to one or more devices, the accessed data;
- capturing, using a camera of the unauthorized device, an image or video and sending, to one or more devices, the captured image or video;
- capturing, using a microphone of the unauthorized device, audio of surroundings of the unauthorized device and sending, to one or more devices, the captured audio;
- causing output, using a software application installed on the unauthorized device, of an audible tone;
- controlling a light of the unauthorized device to flash on and off;
- placing a phone call to one or more devices; or
- sending, to one or more devices, global positioning system (GPS) data associated with the unauthorized device.

35. The system of claim 31, wherein the computing device is configured to determine the information associated with the first device by at least one of:
- determining identification information of the first device;
- determining location information associated with the first device; or
- determining movement patterns associated with the first device.

36. The system of claim 31, wherein the computing device is further configured to:
- send, to the unauthorized device and based on the information, a first access code for authorized access to a first zone of the premises.

37. The system of claim 36, wherein the computing device is further configured to:
- monitor, based on the information, a movement pattern of the unauthorized device to determine whether the unauthorized device is within a proximity of a second zone, of the premises, different from the first zone; and
- based on determining that the unauthorized device is within the proximity of the second zone, cause a security response.

38. The system of claim 36, wherein the first access code permits the unauthorized device authorized access to the first zone for a time period, and
wherein the computing device is further configured to:
- monitor, based on the information, location information of the unauthorized device to determine whether the unauthorized device is within a proximity of the first zone after an expiration of the time period.

39. The system of claim 31, wherein the computing device is further configured to:
- after determining that the first device is an unauthorized device at the premises, monitor, based on the information, location information of the unauthorized device;
- determine, based on the location information, a zone, of the premises, in which the unauthorized device is located; and
- determine, based on the determined zone and based on information that identifies, for each of a plurality of zones of the premises, a corresponding threat level, a security response associated with a threat level corresponding to the determined zone.

40. The system of claim 31, wherein the one or more wireless signals comprise at least one of: cellular signals, Bluetooth signals, ZigBee signals, Z-Wave signals, Thread signals, Wi-Fi signals, global system for mobile (GSM) communication signals, or code division multiple access (CDMA) signals.

* * * * *

UNITED STATES PATENT AND TRADEMARK OFFICE
CERTIFICATE OF CORRECTION

PATENT NO. : 11,386,760 B2
APPLICATION NO. : 16/804603
DATED : July 12, 2022
INVENTOR(S) : Deven Vazirani It is certified that error appears in the above-identified patent and that said Letters Patent is hereby corrected as shown below:

In the Specification

Detailed Description, Column 13, Line 64:
Please delete "and or" and insert --and/or--

Detailed Description, Column 15, Line 7:
After "one", insert --or--

Detailed Description, Column 15, Line 35:
After "one", insert --or--

Detailed Description, Column 15, Lines 60-61:
Delete "activate/and or" and insert --activate and/or--

Detailed Description, Column 18, Line 10:
Delete "500" and insert --550--

Detailed Description, Column 27, Line 24:
Delete "300" and insert --330--

In the Claims

Claim 14, Column 38, Line 47:
After "device,", insert --of--

Claim 14, Column 38, Line 51:
Delete "GPS" and insert --global positioning system (GPS)--

Signed and Sealed this
Twenty-ninth Day of August, 2023

Katherine Kelly Vidal
*Director of the United States Patent and Trademark Office*

CERTIFICATE OF CORRECTION (continued)
U.S. Pat. No. 11,386,760 B2

Claim 31, Column 41, Line 29:
After "signals", delete "that"

Claim 31, Column 41, Lines 35-36:
Delete "device and based on the information," and insert --device,--